US012664111B2

(12) United States Patent
Jiang et al.

(10) Patent No.: US 12,664,111 B2
(45) Date of Patent: Jun. 23, 2026

(54) COMPUTER DEVICE, EXCEPTION PROCESSING METHOD, AND INTERRUPT PROCESSING METHOD

(71) Applicant: HUAWEI TECHNOLOGIES CO., LTD., Guangdong (CN)

(72) Inventors: Yifei Jiang, Hangzhou (CN); Bo Wan, Hangzhou (CN); Siqi Zhao, Shenzhen (CN); Mingwang Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 18/170,741

(22) Filed: Feb. 17, 2023

(65) Prior Publication Data

US 2023/0205713 A1    Jun. 29, 2023

Related U.S. Application Data

(63) Continuation of application No. PCT/CN2021/097829, filed on Jun. 2, 2021.

(30) Foreign Application Priority Data

Aug. 19, 2020    (CN) .......................... 202010839905.3

(51) Int. Cl.
*G06F 13/24*        (2006.01)
*G06F 9/455*        (2018.01)

(52) U.S. Cl.
CPC .......... *G06F 13/24* (2013.01); *G06F 9/45558* (2013.01); *G06F 2009/45579* (2013.01); *G06F 2009/45587* (2013.01)

(58) Field of Classification Search
None
See application file for complete search history.

(56) References Cited

U.S. PATENT DOCUMENTS 8,402,318 B2 *    3/2013    Nieh .................... G06F 11/3419
                                                        717/124
9,158,940 B1 *    10/2015    Suit ........................ G06F 3/0664
(Continued)

FOREIGN PATENT DOCUMENTS

CN        110990180 A        4/2020
JP        2010157232 A       7/2010

OTHER PUBLICATIONS

Kadam Pankaj R et al:"Review on KVM Hypervisor", International Journal of Recent Technology and Engineering (IJRTE),Sep. 4, 2014 (Sep. 4, 2014), pp. 54-59,XP093109432.

*Primary Examiner* — Henry Tsai
*Assistant Examiner* — Christopher A Bartels
(74) *Attorney, Agent, or Firm* — WOMBLE BOND DICKINSON (US) LLP

(57)    ABSTRACT

A computer device is disclosed. In a virtualization I/O procedure, a redirection apparatus in a processor is used to implement privilege level switching in a synchronization processing procedure, to directly switch from a virtualization privilege level of a VM to a user mode of a host, and perform corresponding exception processing. In an asynchronous processing procedure, an interrupt request may be asynchronously transferred by using a virtual event notification apparatus and an interrupt controller in the processor without passing through a kernel mode of the host. In both of a synchronous processing procedure and the asynchronous processing procedure of the device, overheads generated during switching are reduced, and performance of the computer device is improved.

20 Claims, 12 Drawing Sheets

(56)                    References Cited

U.S. PATENT DOCUMENTS

| | | | | |
|---|---|---|---|---|
| 10,447,728 | B1 * | 10/2019 | Steinberg | H04L 63/10 |
| 10,977,203 | B2 * | 4/2021 | Zhang | G06F 3/0607 |
| 11,126,706 | B2 * | 9/2021 | Sovio | G06F 21/602 |
| 11,232,030 | B2 * | 1/2022 | Tsirkin | G06F 12/1408 |
| 11,321,111 | B2 * | 5/2022 | de Lara | G06F 9/5061 |
| 2007/0043531 | A1 * | 2/2007 | Kosche | G06F 11/3476 |
| | | | | 702/182 |
| 2009/0204785 | A1 * | 8/2009 | Yates, Jr. | G06F 9/30189 |
| | | | | 712/202 |
| 2010/0250869 | A1 * | 9/2010 | Adams | G06F 12/0802 |
| | | | | 718/1 |
| 2010/0333090 | A1 * | 12/2010 | Wright | G06F 9/45516 |
| | | | | 718/1 |
| 2011/0047543 | A1 * | 2/2011 | Mohinder | G06F 21/53 |
| | | | | 718/1 |
| 2011/0202610 | A1 * | 8/2011 | Chaturvedi | H04L 45/26 |
| | | | | 709/206 |
| 2011/0296411 | A1 | 12/2011 | Tang et al. | |
| 2012/0239850 | A1 * | 9/2012 | Qiu | G06F 9/45558 |
| | | | | 711/6 |
| 2015/0006953 | A1 * | 1/2015 | Holbrook | H04L 69/40 |
| | | | | 714/13 |
| 2015/0121135 | A1 * | 4/2015 | Pape | G06F 11/0712 |
| | | | | 718/1 |
| 2017/0213039 | A1 * | 7/2017 | Werner | G06F 12/145 |
| 2019/0199599 | A1 * | 6/2019 | Zavesky | H04L 41/0672 |
| 2019/0377612 | A1 * | 12/2019 | Zhu | G06F 9/5027 |
| 2020/0125397 | A1 | 4/2020 | Wu et al. | |
| 2020/0403940 | A1 * | 12/2020 | Daly | H04L 49/70 |
| 2020/0409740 | A1 * | 12/2020 | Li | G06F 9/5077 |
| 2021/0334004 | A1 * | 10/2021 | Krivenok | H04L 12/4641 |
| 2021/0342092 | A1 * | 11/2021 | Wu | G06F 12/1491 |
| 2022/0327770 | A1 * | 10/2022 | Wyman | G06T 15/005 |
| 2022/0391493 | A1 * | 12/2022 | Yuan | G06F 21/74 |
| 2022/0392142 | A1 * | 12/2022 | Wolfe | G06T 5/70 |
| 2023/0089528 | A1 * | 3/2023 | Oliver | G06F 9/546 |
| | | | | 713/100 |

* cited by examiner

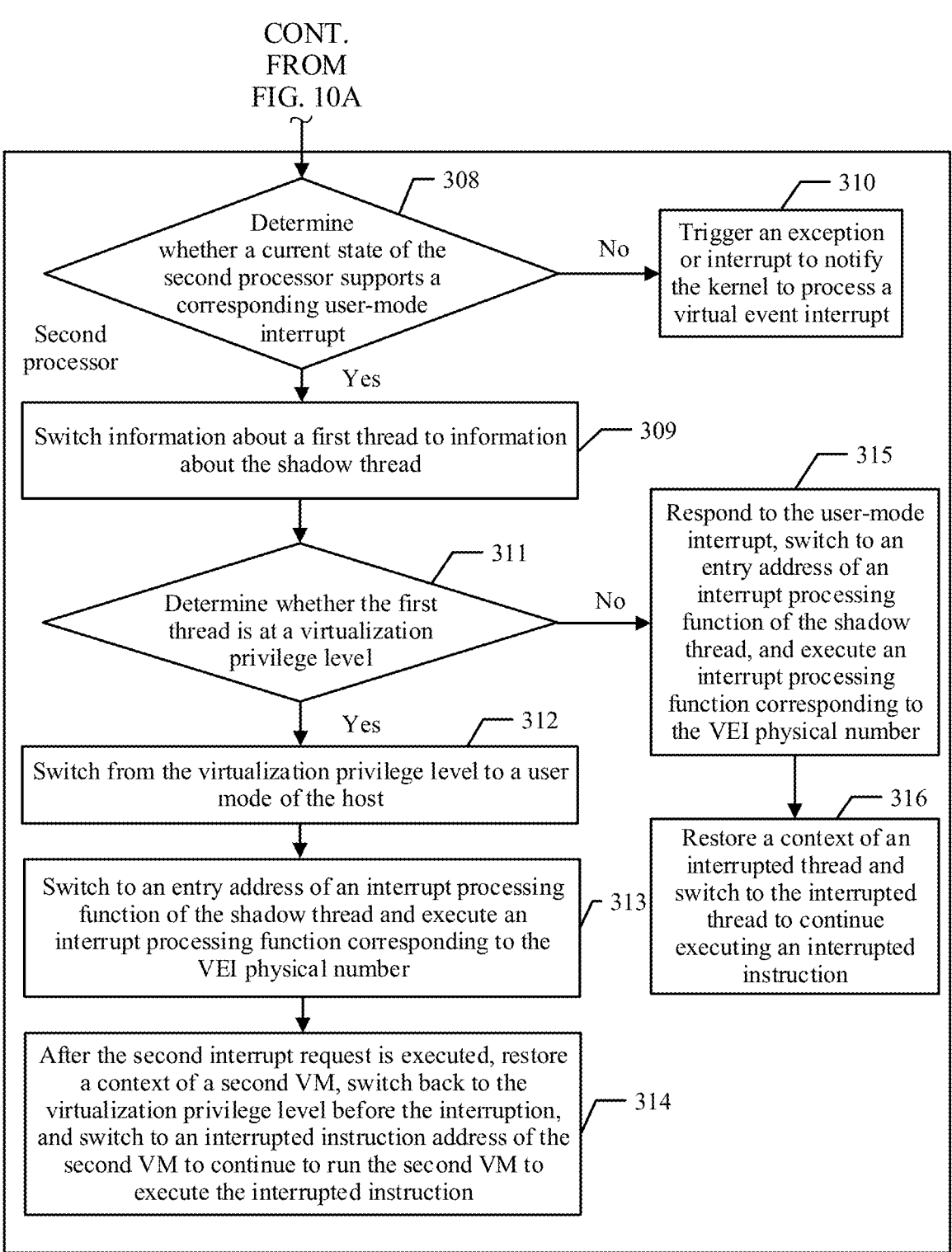

CONT.
FROM
FIG. 10A

308
Second processor
Determine whether a current state of the second processor supports a corresponding user-mode interrupt No → 310
Trigger an exception or interrupt to notify the kernel to process a virtual event interrupt Yes 309
Switch information about a first thread to information about the shadow thread 311
Determine whether the first thread is at a virtualization privilege level No → 315
Respond to the user-mode interrupt, switch to an entry address of an interrupt processing function of the shadow thread, and execute an interrupt processing function corresponding to the VEI physical number Yes 312
Switch from the virtualization privilege level to a user mode of the host 313
Switch to an entry address of an interrupt processing function of the shadow thread and execute an interrupt processing function corresponding to the VEI physical number 316
Restore a context of an interrupted thread and switch to the interrupted thread to continue executing an interrupted instruction 314
After the second interrupt request is executed, restore a context of a second VM, switch back to the virtualization privilege level before the interruption, and switch to an interrupted instruction address of the second VM to continue to run the second VM to execute the interrupted instruction

FIG. 10B

COMPUTER DEVICE, EXCEPTION PROCESSING METHOD, AND INTERRUPT PROCESSING METHOD

CROSS-REFERENCE TO RELATED APPLICATIONS

This application is a continuation of International Application No. PCT/CN2021/097829, filed on Jun. 2, 2021, which claims priority to Chinese Patent Application No. 202010839905.3, filed on Aug. 19, 2020. The disclosures of the aforementioned applications are hereby incorporated by reference in their entireties.

TECHNICAL FIELD

This application relates to the field of computer technologies, and specifically, to a computer device, an exception processing method, and an interrupt processing method.

BACKGROUND

In a virtualization system, a virtual device simulation solution is mainly used to implement input/output (I/O) virtualization. The virtual device simulation solution can be classified into synchronous processing and asynchronous processing based on a mode of processing virtual I/O.

In a synchronization processing procedure, an exception instruction is triggered when a virtual machine (VM) performs an operation related to a virtual I/O device (for example, a read operation or a write operation on a serial port memory, or an access operation on another virtual I/O device). The VM sends the exception instruction to a virtual machine monitor (VMM) in a kernel mode of a host, and the VMM transfers the exception instruction to the host in a user mode, to perform process an exception in the user mode of the host. After the exception is processed, a processing result is transferred from the host in the user mode to the VMM, and then transferred from the VMM to the VM. In this procedure, overheads of switching between the VM and the VMM are generated twice, and overheads of switching between the kernel mode of the host and the user mode of the host are generated twice.

In an asynchronous processing procedure, when the VM performs the read operation or the write operation on a memory of a disk or a memory of a network adapter, an interrupt request is triggered. The interrupt request needs to notify, in an asynchronous manner, a quick emulator (Qemu) thread on a remote processor to complete processing of the interrupt request. The remote processor is another processor different from a local processor that supports running of the VM. On the local processor, the VM triggers an exception instruction, and then the VM sends the exception instruction to the VMM in the kernel mode of the host. Then, the VMM identifies the instruction as a user-mode exception instruction, the VMM transfers the exception instruction from the kernel mode of the host to the user mode of the host, and a system call is triggered from the user mode of the host to enter the kernel mode of the host, then the interrupt request is triggered in the kernel mode of the host, and the interrupt request is transferred to the remote processor. The Qemu thread of the remote processor needs to wake up a scheduler in the kernel mode. In this procedure, the kernel mode needs to be switched to the user mode, and then switched back to the kernel mode by using a system call, to access physical devices such as a disk. It can be learned that in the asynchronous processing procedure, switching between the user mode and the kernel mode also needs to be frequently performed.

In both of the synchronous processing procedure and the asynchronous processing procedure, overheads are generated for a plurality of times during switching, and I/O performance is affected.

SUMMARY

Embodiments of this application provide a computer device, an exception processing method, and an interrupt processing method, to reduce overheads generated during switching and improve performance of the computer device. This application further provides a corresponding apparatus, a computer-readable storage medium, a computer program product, and the like.

A first aspect of this application provides a computer device, where the computer device includes a hardware layer, a host runs at the hardware layer, the hardware layer includes a first processor, a virtual machine (VM) runs on the first processor, and the first processor includes a redirection apparatus. The first processor is configured to obtain an exception instruction triggered by a VM. The redirection apparatus is configured to switch from a virtualization privilege level of the VM to a user mode of the host. The first processor is further configured to execute, in the user mode of the host, an exception processing function corresponding to the exception instruction.

In an embodiment, an exception triggered by the VM is processed in a synchronous processing manner.

It should be noted that the processor in this embodiment of this application may be a processor core, and one processor core supports running of one VM within one time period. A plurality of VMs may use a same processing core in a time division multiplexing manner.

In an embodiment, the computer device may be a terminal device such as a mobile phone, a tablet computer, a desktop computer, a notebook computer, an ultra-mobile personal computer (UMPC), a handheld computer, or a netbook; or the computer device may be a server. The hardware layer may include hardware devices such as a processor, a memory, and a communication interface. The VM and the host are simulated by software and run at the hardware layer. The redirection apparatus included in the first processor may be implemented by using a hardware circuit. The exception instruction may be triggered when the VM performs an input/output (I/O) operation. The I/O operation may be an operation triggered when the VM needs to access a virtual I/O device. The virtual I/O device generally includes a front-end driver and a back-end device. The front-end driver runs on the VM, and a program of the back-end device runs on the host. If an operation performed by the VM needs to access the back-end device by using the front-end driver, the exception instruction is triggered, and the back-end device is accessed by using the exception instruction. The virtual I/O device is a type of back-end device. Accessing the virtual I/O device may be reading data from a memory of the virtual I/O device or writing data into the memory of the virtual I/O device. The virtual I/O device is an I/O device that can be used by a virtual machine. The virtual I/O device may be a completely virtualized I/O device simulated by using software. The virtual I/O device may also be mapped to a physical I/O device in a mapping manner. When the virtual I/O device is accessed, the physical I/O device is finally accessed.

The exception instruction may be that an exception occurs when the first VM performs an operation beyond permission of the first VM. The first processor may detect exception code by invoking computer instructions stored in the memory and executing corresponding detection logic. This operation may also be that the first processor detects the exception code by executing hardware detection logic, and then obtains the exception instruction. After obtaining the exception instruction, the first processor may write a cause and a type of the exception, a memory to be accessed by the first VM, and a return address into a hardware register for subsequent exception processing.

The virtualization privilege level of the VM represents a privilege level in a virtualization mode, that is, a working mode of the VM, and may also be referred to as a virtualization mode. The virtualization privilege level includes a virtualized user mode and a virtualized kernel mode. Switching (directly switching) from the virtualization privilege level of the VM to the user mode of the host may include a procedure of migrating information about the virtualization privilege level of the VM out of a register used to store the privilege level, and then writing information about the user mode of the host into the register, where the register may be a system register. In this application, the privilege level and virtualization may be respectively represented by using one bit. For example, 0 indicates a user mode, 1 indicates a kernel mode, 0 indicates non-virtualization, and 1 indicates virtualization. The privilege level is in a first bit, and whether to virtualize is in a second bit. For example, 00 indicates a non-virtualized user mode, which may also be referred to as a user mode of a host; 10 indicates a non-virtualized kernel mode, which may also be referred to as a kernel mode of a host; 01 indicates a virtualized user mode, which may also be referred to as a user mode of a VM; and 11 indicates a virtualized kernel mode, which may also be referred to as a kernel mode of a VM.

A user-mode host refers to the host working in the user mode. A user mode of the host refers to a working mode of the host. The working mode of the host includes a user mode and a kernel mode.

That the redirection apparatus is configured to switch from the virtualization privilege level of the VM to the user mode of the host may be understood as that the redirection apparatus is configured to: switch a working mode of the first processor. To be specific, the redirection apparatus is configured to switch the working mode of the first processor from the virtualization mode to the user mode (the user mode of the host) in the non-virtualization mode. The working mode of the processor may be understood as a working status of the processor, and the working status of the processor may be represented by a value of a bit in the foregoing system register.

The exception processing function may be included in a thread of a virtual processor (vCPU) running in the user mode of the host. The first processor may execute, in the user mode of the host, the exception processing function corresponding to the exception instruction. The exception instruction may be associated with the exception processing function based on an exception type. Different exception types may correspond to different exception processing functions. For example, an exception processing function corresponding to a write operation performed by the VM on a serial port is different from an exception processing function corresponding to a write operation performed by the VM on a graphics card, or all exception instructions may correspond to a same exception processing function, and when the exception processing function is executed, different data is invoked to process different exception instructions. For example, if the exception instruction is triggered by an I/O operation performed by the VM, a corresponding I/O operation is completed by executing the exception processing function, for example, reading data in a memory of the I/O device or writing data into the memory of the I/O device. If the exception instruction is triggered by another operation (for example, a page fault) performed by the VM, the first processor executes the exception processing function to process the page fault. In other words, the redirection apparatus is configured to switch from the virtualized mode to the non-virtualized mode. Therefore, the interrupt or exception in the user mode may be redirected to user space of the host for processing, that is, the host in the user mode executes the exception or interrupt processing function.

It can be learned from the first aspect that the computer device may directly switch the exception instruction from the virtualization privilege level of the VM to the user mode of the host by using the redirection apparatus, and execute the exception processing function in the user mode of the host. Compared with the conventional technology in which the virtualization privilege level of the VM needs to be first switched to a kernel mode of the host, and then the kernel mode of the host needs to be switched to the user mode of the host, the computer device can reduce switching overheads, and improve performance of the computer device.

In an embodiment, the redirection apparatus is further configured to write an entry address of an exception processing function into a first register. The first processor is specifically configured to: read the entry address of the exception processing function from the first register, invoke the exception processing function based on the entry address, and execute, in the user mode of the host, the exception processing function corresponding to the exception instruction.

In this embodiment, the redirection apparatus may write the entry address of the exception processing function (which may be referred to as a trap handler) into the first register. In this way, the first processor subsequently reads the entry address from the first register, invokes the exception processing function based on the entry address, and executes the exception processing function in the user mode of the host. The "redirection" in the redirection apparatus may include privilege level switching and a procedure of writing the entry address of the exception processing function into the first register. In this embodiment, the redirection apparatus writes the entry address into the first register, so that the first processor can quickly execute the exception processing function.

In an embodiment, the exception processing function is included in a thread of a virtual processor that runs in the user mode of the host, and an execution environment allocated to the thread of the virtual processor includes a main thread execution environment, an execution environment of the VM, and a shadow execution environment, where the execution environment allocated to the thread of the virtual processor is a resource required for running the thread of the virtual processor, and the shadow execution environment has user-mode memory space independent of the main thread execution environment and the execution environment of the VM. The shadow execution environment is used to execute the exception processing function, and the exception processing function is used to process an exception that triggers the exception instruction. The first processor is configured to switch from a context of the VM to a context of the user-mode shadow execution environment, and the user-mode memory space of the shadow execution environment is used to store the context of the VM that is migrated out during context switching.

In this application, executing the exception processing function includes a procedure of context switching and processing an exception in the user mode of the host.

In this embodiment, before the thread of the virtual processor runs, the thread of the virtual processor applies to the host for a resource, and the host allocates, to the thread of the virtual processor, the resource required for running. The resource may be referred to as an execution environment. The "execution environment" in this application includes two aspects: a software execution environment and a hardware execution environment. The software execution environment includes information in stacks used when threads of the virtual processor run in different execution environments, and context information of the threads. The hardware aspect includes hardware resources used when the threads run, including memory resources or processing resources. All of the main thread execution environment, the execution environment of the VM, and the shadow execution environment have independent memory space. The main thread execution environment includes an execution environment of a main thread in a user mode and an execution environment of a main thread in a kernel mode. The execution environment of the main thread in the kernel mode is used to store contexts of the VM and the host. The shadow execution environment includes a user-mode shadow execution environment and a kernel-mode shadow execution environment. The user-mode shadow execution environment is the user-mode memory space of the shadow execution environment. The user-mode memory space represents memory address space corresponding to the user-mode shadow execution environment, and the user-mode memory space is used to store a context of a VM that is migrated out of a register during context switching. Because the shadow execution environment has independent user-mode memory space, the user-mode memory space may store a context of the VM, and does not need to first switch, by using the main thread execution environment, from the virtualization privilege level of the VM to the kernel mode of the host and then switch from the kernel mode to the user mode. In this way, switching overheads can be further reduced, performance of the computer device is improved.

In an embodiment, the first processor is further configured to: if an interrupt or an exception that needs to be processed in the kernel mode of the host is generated when the exception processing function is executed, switch from the context of the user-mode shadow execution environment to a context of the kernel-mode shadow execution environment; process, in the kernel mode of the host, the interrupt or the exception that needs to be processed in the kernel mode of the host; and switch from the context of the shadow execution environment of the kernel mode back to the context of the user-mode shadow execution environment, to continue to execute the exception processing function.

In this embodiment, the shadow execution environment further includes a kernel-mode shadow execution environment, that is, kernel-mode user space. When a context of the user-mode shadow execution environment is switched to a context of the kernel-mode shadow execution environment, the kernel-mode user space is used to store a context that is of the user-mode shadow execution environment and that is switched from the register. This embodiment can ensure that when the exception processing function is executed, an interrupt or an exception that needs to be executed in a kernel mode is processed, and compatibility of the computer system is improved.

A second aspect of this application provides a computer system. The computer system further includes a second processor and an interrupt controller on the basis of the computer system provided in the first aspect. For a procedure before the exception processing function is executed in the first aspect, refer to the content in the first aspect. A difference lies in that the first processor does not execute the exception processing function, but sends an access request to the interrupt controller, where the access request indicates to access user-mode address mapping space in the interrupt controller. Then, the interrupt controller sends an interrupt request to the second processor; and the second processor executes the exception processing function based on the interrupt request.

In one embodiment, redirection to a user mode of a host is implemented by using the redirection apparatus in the synchronization processing solution of the first aspect, and then an asynchronous processing procedure is implemented by accessing the user-mode address mapping space in the interrupt controller. According to the second aspect, switching from a privilege level of a VM to a user mode of a host is implemented by using the redirection apparatus. Therefore, switching overheads of asynchronous processing are reduced, and performance of the computer device is improved.

A third aspect of this application provides a computer device, where the computer device includes a hardware layer, a host runs at the hardware layer, the hardware layer includes a first processor, a second processor, and an interrupt controller, a virtual machine first VM runs on the first processor, and the first processor includes a virtual event notification apparatus. The first processor is configured to obtain a first interrupt request triggered by the first VM, where the first interrupt request is used to request to execute an interrupt processing function; the virtual event notification apparatus is configured to directly send interrupt information to the interrupt controller in response to the first interrupt request; the interrupt controller is configured to: determine an identifier of the second processor based on the interrupt information, and send a second interrupt request to the second processor based on the identifier of the second processor; and the second processor is configured to execute the interrupt processing function in response to the received second interrupt request.

In an embodiment, the interrupt triggered by the first VM is processed in an asynchronous processing manner. The asynchronous processing refers to a cross-processor processing procedure, that is, the first VM running on the first processor executes the interrupt, and the interrupt processing procedure can be completed by using the second processor.

In an embodiment, a virtual event notification apparatus may be implemented by using a hardware circuit. The first interrupt request may be triggered when the first VM performs an I/O operation, and the I/O operation may be an operation triggered when the first VM needs to access a virtual I/O device. The interrupt information indicates a virtual event that occurs in the first VM. According to the computer device that processes an interrupt in an asynchronous manner and that is provided in the third aspect, the virtual event notification apparatus may process an interrupt event without being trapped in a kernel mode of the host. Therefore, privilege level switching overheads are reduced, and performance of the computer device is improved.

In an embodiment, the first interrupt request includes a virtual event interrupt request number VEI ID, and the VEI ID identifies a virtual event that triggers the first interrupt request. The first processor is further configured to obtain a VM ID of the first VM. The interrupt information includes the VEI ID and the VM ID of the first VM. The interrupt controller is specifically configured to: determine, based on the VEI ID and the VM ID of the first VM, an identifier of the corresponding second processor, a VEI physical number, and a privilege level of the host that processes the first interrupt request, where the VEI physical number identifies the virtual event in the host; and send a second interrupt request to the second processor based on the identifier of the second processor, where the second interrupt request includes information indicating the privilege level of the host. The second processor is specifically configured to: obtain the VEI physical number, and execute, based on a processing manner corresponding to the privilege level of the host, an interrupt processing function corresponding to the VEI physical number in response to the received second interrupt request.

In this embodiment, the VEI ID identifies a virtual event that occurs in the virtual machine, and the VEI physical number indicates an identifier of the virtual event in the host. There is a mapping relationship between the VEI ID and the VEI physical number. A VEI ID and a VEI physical number that are mutually mapped indicate a same virtual event (for example, a disk read/write event or a network adapter read/write event). The VEI ID may be represented by a value, for example, 0 to 63. Each value identifies a different virtual event. One I/O device may have a plurality of different virtual events. For example, a disk read event may be represented by a value 1, a disk write event may be represented by a value 2, a disk control event may be represented by a value 3, a network adapter read event may be represented by a value 4, a network adapter write event may be represented by a value 5, and the like. A same virtual event in each virtual machine may use a same VEI ID. The VEI physical number may be globally unique, and virtual events of a same VEI ID that occur on different virtual machines may correspond to different VEI physical numbers. For example, a VEI physical number corresponding to a value range of a VEI ID of a VM 1 may be 0 to 63, a VEI physical number corresponding to a value range of a VEI ID of a VM 2 may be 64 to 127, and the rest may be deduced by analogy. In this way, the second processor may determine, based on ranges of different VEI physical numbers, a virtual machine on which a virtual event occurs, and then determine, based on a specific value of a VEI physical number, a virtual event that occurs on the VM. For example, a VEI ID being 5 indicates a disk read event, and if a VEI physical number being 5, it indicates that a disk read event occurs on the VM 1. If a VEI physical number being 69, it indicates that a disk read event occurs on the VM 2. A correspondence between a virtual event and a VEI ID and a correspondence between a VEI physical number and a virtual machine may be set based on a requirement. This is not limited in this application.

In some embodiments, because a same virtual event in each virtual machine may use a same VEI ID, to distinguish between virtual machines on which the virtual event occurs, the first processor may obtain a VM ID, where the VM ID may be read by the first processor from a register for storing a virtual machine identifier. Then, the virtual event notification apparatus sends the VEI ID and the VM ID to the interrupt controller, and the interrupt controller may search for the identifier of the second processor, the VEI physical number, and the privilege level of the corresponding host based on the VEI ID and the VM ID. The interrupt controller may maintain a mapping table whose input is (VEI ID)+(VM ID) and output is (CPU ID)+(VEI physical number)+(privilege level of a host). The interrupt controller can directly determine a corresponding (CPU ID)+(VEI physical number)+(privilege level of a host) based on the mapping table. The interrupt controller may determine, based on the CPU ID, the second processor that subsequently performs asynchronous interrupt processing, and may determine, based on the privilege level of the host, whether to use a user-mode processing manner or a kernel-mode processing manner subsequently. The second processor may read the VEI physical number from a register that stores the VEI physical number, determine, by using the VEI physical number, an interrupt processing function corresponding to the VEI physical number, and then execute the interrupt processing function based on a user-mode processing procedure or a kernel-mode processing procedure. In the computer device, a mapping relationship between a VEI physical number and an interrupt processing function may be maintained by using a memory, and the second processor may read a corresponding interrupt processing function from the memory based on the VEI physical number. In this embodiment, a virtual event that occurs on the virtual machine may be quickly determined by using the VEI ID and the VM ID, and then the virtual event notification apparatus and the interrupt controller may process the interrupt event without being trapped in the kernel mode of the host. Therefore, privilege level switching overheads are reduced, and performance of the computer device is improved.

In an embodiment, the first interrupt request includes a virtual event interrupt request number VEI ID, the VEI ID identifies a virtual event that causes the first VM to trigger the first interrupt request, and the interrupt information includes the VEI ID. The interrupt controller is specifically configured to: determine, based on the VEI ID, an identifier of the corresponding second processor and a privilege level of the host that processes the first interrupt request; and send a second interrupt request to the second processor based on the identifier of the second processor, where the second interrupt request includes information indicating the privilege level of the host. The second processor is specifically configured to: obtain the VEI ID, and execute, based on a processing manner corresponding to the privilege level of the host, an interrupt processing function corresponding to the VEI ID in response to the received second interrupt request.

In this embodiment, the VEI ID may be globally unique, and different VMs use different VEI IDs for a same virtual event. In this way, the VM ID does not need to be used, the VEI physical number does not need to be converted, and subsequent interrupt processing can be performed provided that the identifier of the corresponding second processor and the privilege level of the host are determined based on the VEI ID. The second processor may obtain the VEI ID from a register that stores the VEI ID. In this embodiment, a virtual event that occurs on the virtual machine may be quickly determined by using the VEI ID, and then the virtual event notification apparatus and the interrupt controller may process the interrupt event without being trapped in the kernel mode of the host. Therefore, privilege level switching overheads are reduced, and performance of the computer device is improved.

In an embodiment, the privilege level of the host is a user mode; and the interrupt controller may further set information about a shadow thread. The second processor further includes a hardware-assisted switching apparatus. The hardware-assisted switching apparatus is configured to switch from a first thread to the shadow thread, where the first thread is a thread run by the second processor before switching, the shadow thread is a thread that runs in the host in the user mode, and the shadow thread is used to execute the interrupt processing function. The second processor is specifically configured to execute the interrupt processing function in the user mode of the host.

In this embodiment, the first thread may also be referred to as an interrupted thread, or the first thread may switch information about an interrupted thread to information about the shadow thread, where the interrupted thread is a thread running by the second processor before switching. The second processor is further configured to: switch to an entry address of the interrupt processing function of the shadow thread, and execute the interrupt processing function in the user mode of the host, where the interrupt processing function corresponds to the second interrupt request.

In this embodiment, the hardware-assisted switching apparatus may be implemented by using a hardware circuit. Thread switching may include switching information about a thread, and information about the first thread includes memory address space, a page table head address, data structure information, a processing privilege level, and the like of the first thread. The shadow thread is a thread running in the host in the user mode, and is configured to execute the interrupt processing function. The information about the shadow thread includes memory address space of the shadow thread, a page table start address, data structure information, a processing privilege level, and the like. The shadow thread may be understood as a shadow of the first thread. After the first thread that is running by the second processor is interrupted, the second processor runs the shadow thread to perform interrupt processing. In this embodiment, the information about the first thread and the information about the shadow thread can be quickly switched by using the hardware-assisted switching apparatus without being trapped in the kernel mode of the host, so that an interrupt can be directly processed in the user mode of the host. Therefore, switching overheads are further reduced, and performance of the computer device is improved.

In an embodiment, the second processor further includes a redirection apparatus, and the second processor is further configured to: before executing the interrupt processing function in the user mode of the host, determine whether the first thread is at a virtualization privilege level of a second VM, where the second VM runs on the second processor. The redirection apparatus is configured to: if an interrupted thread is at the virtualization privilege level of the second VM, switch the virtualization privilege level of the second VM to the user mode of the host.

In this embodiment, the redirection apparatus in the second processor may be implemented by using a hardware circuit. For a function of the redirection apparatus, refer to the function of the redirection apparatus in the first aspect. In this embodiment, the virtualization privilege level of the second VM may be directly switched to the user mode of the host by using the redirection apparatus in the second processor. Therefore, switching overheads in an asynchronous processing procedure are further reduced, and performance of the computer device is further improved.

In an embodiment, the redirection apparatus is further configured to write an entry address of the interrupt processing function into a first register. The second processor is specifically configured to read the entry address of the interrupt processing function from the first register, invoke the interrupt processing function based on the entry address, and execute, in the user mode of the host, the interrupt processing function.

The procedure may be performed immediately by using corresponding content in the first aspect, and details are not described herein again.

In an embodiment, the second processor is specifically configured to: switch from a context of the second VM to a context of the shadow thread, and process an interrupt in the user mode of the host; and switch from the context of the shadow thread back to the context of the second VM after processing the interrupt. The redirection apparatus is further configured to switch from the user mode of the host back to the virtualization privilege level of the second VM. The second processor is further configured to continue to run the second VM.

In this embodiment, executing the interrupt processing function includes a procedure of context switching and a procedure of processing an interrupt. In this solution, the redirection apparatus directly switches from the user mode of the host to the virtualization privilege level of the second VM, so that the interrupted second VM can be quickly started.

In an embodiment, the second processor is further configured to: switch from a context of the first thread to a context of the shadow thread, and process an interrupt in the user mode of the host; switch from the context of the shadow thread to the context of the first thread after processing the interrupt; and continue to execute the first thread.

In this embodiment, if no virtual machine runs on the second processor, the second processor may directly switch the context of the first thread and the context of the shadow thread, then process the interrupt, and then switch back to the context of the first thread. In this way, the first thread can be quickly started, so that the first thread continues running.

In an embodiment, the privilege level of the host is a kernel mode, and the second processor is configured to: receive the second interrupt request that is of the kernel mode of the host and that is sent by the interrupt controller; and switch to an entry address of an interrupt processing function of the kernel mode of the host, where the interrupt processing function corresponds to the second interrupt request; and execute, in the kernel mode of the host, the interrupt processing function of the kernel mode.

In this embodiment, if the privilege level of the host is the kernel mode, the interrupt controller may directly send a kernel-mode interrupt to the second processor, and the second processor performs a kernel-mode processing procedure to complete a corresponding operation. Before the second processor switches to the entry address of the interrupt processing function of the kernel mode of the host, if the second VM runs on the second processor, the second processor first switches from the virtualization privilege level of the second VM to the kernel mode of the host. If no virtual machine runs on the second processor, and the host is in the user mode, the second processor first switches from the user mode of the host to the kernel mode of the host. If the host is in the kernel mode, the second processor directly switches to the entry address of the interrupt processing function, and then executes the interrupt processing function.

A fourth aspect of this application provides a computer device, where the computer device includes a first processor, a second processor, and an interrupt controller, a host runs on the computer device, and the second processor further includes a hardware-assisted switching apparatus. The first processor may send an interrupt request to the interrupt controller by accessing user-mode address mapping space or kernel-mode address mapping space in the interrupt controller. The interrupt controller sets information about a shadow thread. The interrupt controller sends the interrupt request to the second processor. The hardware-assisted switching apparatus is configured to switch from a first thread to the shadow thread, where the first thread is a thread run by the second processor before switching, the shadow thread is a thread that runs in the host in a user mode and that includes an interrupt processing function, and the interrupt processing function corresponds to a second interrupt request. The second processor is specifically configured to execute the interrupt processing function in the user mode of the host.

In this embodiment, the hardware-assisted switching apparatus may be implemented by using a hardware circuit. Thread switching may include information about switching a thread. Information about the first thread includes memory address space of the first thread, a page table start address, data structure information, and a processing privilege level. The shadow thread is a thread running in the host in the user mode, and is used to execute the interrupt processing function. Information about the shadow thread includes memory address space of the shadow thread, a page table start address, data structure information, a processing privilege level, and the like. The first thread is a thread that is being run by the second processor. The shadow thread may be understood as a shadow of the first thread. After a thread that is running by the second processor is interrupted, the second processor runs the shadow thread to perform interrupt processing. In this embodiment, the information about the first thread and the information about the shadow thread can be quickly switched by using the hardware-assisted switching apparatus without being trapped in the kernel mode of the host, so that an interrupt can be directly processed in the user mode of the host. Therefore, switching overheads are further reduced, and performance of the computer device is improved.

In an embodiment, the second processor further includes a redirection apparatus, and the second processor is further configured to: before executing the interrupt processing function in the user mode of the host, determine whether the first thread is at a virtualization privilege level of a second VM, where the second VM runs on the second processor. The redirection apparatus is configured to: if the first thread is at the virtualization privilege level of the second VM, switch the virtualization privilege level of the VM to the user mode of the host.

In this embodiment, the redirection apparatus in the second processor may be implemented by using a hardware circuit. For a function of the redirection apparatus, refer to the function of the redirection apparatus in the first aspect. In this embodiment, the virtualization privilege level of the second VM may be directly switched to the user mode of the host by using the redirection apparatus in the second processor. Therefore, switching overheads in an asynchronous processing procedure are further reduced, and performance of the computer device is further improved.

In an embodiment, the redirection apparatus is further configured to write an entry address of the interrupt processing function into a first register. The second processor is specifically configured to read the entry address of the interrupt processing function from the first register, invoke the interrupt processing function based on the entry address, and execute, in the user mode of the host, the interrupt processing function.

The procedure may be performed immediately by using corresponding content in the first aspect, and details are not described herein again.

In an embodiment, the second processor is specifically configured to: switch from a context of the second VM to a context of the shadow thread, and process an interrupt in the user mode of the host; and switch from the context of the shadow thread back to the context of the second VM after processing the interrupt. The redirection apparatus is further configured to switch from the user mode of the host back to the virtualization privilege level of the second VM. The second processor is further configured to continue to run the second VM.

In this embodiment, executing the interrupt processing function includes a procedure of context switching and a procedure of processing an interrupt. In this solution, the redirection apparatus directly switches from the user mode of the host to the virtualization privilege level of the second VM, so that the interrupted second VM can be quickly started.

In an embodiment, the second processor is further configured to: switch from a context of the first thread to a context of the shadow thread, and process an interrupt in the user mode of the host; switch from the context of the shadow thread to the context of the first thread after processing the interrupt; and continue to execute the first thread.

In this embodiment, if no virtual machine runs on the second processor, the second processor may directly switch the context of the first thread and the context of the shadow thread, then process the interrupt, and then switch back to the context of the first thread. In this way, the first thread can be quickly started, so that the first thread continues running.

In an embodiment, the privilege level of the host is a kernel mode, and the second processor is configured to: receive a second interrupt request that is of the kernel mode of the host and that is sent by the interrupt controller; switch to an entry address of an interrupt processing function of the kernel mode of the host, where the interrupt processing function corresponds to the second interrupt request; and execute, in the kernel mode of the host, the interrupt processing function of the kernel mode.

In this embodiment, if the privilege level of the host is the kernel mode, the interrupt controller may directly send a kernel-mode interrupt to the second processor, and the second processor performs a kernel-mode processing procedure to complete a corresponding operation. Before the second processor switches to the entry address of the interrupt processing function of the kernel mode of the host, if the second VM runs on the second processor, the second processor first switches from the virtualization privilege level of the second VM to the kernel mode of the host. If no virtual machine runs on the second processor, and the host is in the user mode, the second processor first switches from the user mode of the host to the kernel mode of the host. If the host is in the kernel mode, the second processor directly switches to the entry address of the interrupt processing function, and then executes the interrupt processing function.

A fifth aspect of this application provides an exception processing method, where the method is applied to a computer device, a host and a virtual machine VM run on the computer device, and the method includes: obtaining an exception instruction triggered by the VM; and switching from a virtualization privilege level of the VM to a user mode of the host; and executing an exception processing function corresponding to the exception instruction in the user mode of the host.

In an embodiment, the method further includes: writing an entry address of the exception processing function into a first register. The first processor is specifically configured to read the entry address of the exception processing function from the first register, invoke the exception processing function based on the entry address, and execute, in the user mode of the host, the exception processing function corresponding to the exception instruction.

In an embodiment, the exception instruction is triggered by performing an input/output I/O operation by the VM.

In an embodiment, the method further includes: switching from a context of the VM to a context of a user-mode shadow execution environment, and processing an exception in the user mode of the host; the exception processing function is included in a thread of a virtual processor that runs in the user mode of the host, an execution environment allocated to the thread of the virtual processor includes a main thread execution environment, an execution environment of the VM, and a shadow execution environment, where the execution environment allocated to the thread of the virtual processor is a resource required for running the thread of the virtual processor, and the shadow execution environment has user-mode memory space independent of the main thread execution environment and the execution environment of the VM; and the shadow execution environment is used to execute the exception processing function, and the exception processing function is used to process an exception that triggers the exception instruction.

For the exception processing method provided in the fifth aspect and any possible implementation, refer to related descriptions of the first aspect and any possible implementation of the first aspect. Details are not described herein again.

A sixth aspect of this application provides an interrupt processing method, where the method is applied to a computer device, a host and a first VM run on the computer device, and the method includes: obtaining a first interrupt request triggered by the first VM, where the first interrupt request is used to request to execute an interrupt processing function; determining interrupt information in response to the first interrupt request; generating a second interrupt request based on the interrupt information, where the second interrupt request is used to request to execute the interrupt processing function; and executing the interrupt processing function in response to the second interrupt request, where the second interrupt request is obtained by using the first interrupt request.

In an embodiment, the first interrupt request includes a virtual event interrupt request number VEI ID, and the VEI ID identifies a virtual event that triggers the first interrupt request; and the method further includes: obtaining a VM ID of the first VM, where the interrupt information includes the VEI ID and the VM ID of the first VM; determining, based on the VEI ID and the VM ID of the first VM, a VEI physical number and a privilege level of the host that processes the first interrupt request, where the VEI physical number identifies the virtual event in the host; and the foregoing operation of executing the interrupt processing function in response to the second interrupt request includes: obtaining the VEI physical number, and executing, based on a processing manner corresponding to the privilege level of the host, an interrupt processing function corresponding to the VEI physical number in response to the received second interrupt request.

In an embodiment, the first interrupt request includes a virtual event interrupt request number VEI ID, the VEI ID identifies a virtual event that triggers the first interrupt request, and the interrupt information includes the VEI ID; and the method further includes: determining, based on the VEI ID, a privilege level of the host that processes the first interrupt request; and the foregoing operation of executing the interrupt processing function in response to the second interrupt request includes: obtaining the VEI ID, and executing, based on a processing manner corresponding to the privilege level of the host, an interrupt processing function corresponding to the VEI ID in response to the received second interrupt request.

In an embodiment, the privilege level of the host is a user mode; and in the foregoing operation of executing the interrupt processing function in response to the second interrupt request includes: switching from a first thread to a shadow thread, where the first thread is a thread that runs in the host before switching, the shadow thread is a thread that runs in the host in the user mode, and the shadow thread is used to execute the interrupt processing function; and executing the interrupt processing function in user mode of the host.

In an embodiment, the method further includes: before executing the interrupt processing function in the user mode of the host, determining whether the first thread is at a virtualization privilege level of a second VM, where the second VM runs on the computer device; and if an interrupted thread is at the virtualization privilege level of the second VM, switching the virtualization privilege level of the second VM to the user mode of the host.

In an embodiment, the method further includes: writing an entry address of the interrupt processing function into a first register; and reading the entry address of the interrupt processing function from the first register, invoking the interrupt processing function based on the entry address, and executing, in the user mode of the host, the interrupt processing function.

In an embodiment, the foregoing operation of executing the interrupt processing function in the user mode of the host includes: switching from a context of the second VM to a context of the shadow thread, and processing an interrupt in the user mode of the host; switching from the context of the shadow thread to the context of the second VM after the interrupt is processed; switching from the user mode of the host back to the virtualization privilege level of the second VM; and continuing to run the second VM.

In an embodiment, the method further includes: switching from a context of the first thread to a context of the shadow thread, and processing an interrupt in the user mode of the host; switching from the context of the shadow thread to the context of the first thread after the interrupt is processed; and continuing to execute the first thread.

In an embodiment, the privilege level of the host is a kernel mode, and the foregoing operation of executing, based on the processing manner corresponding to the privilege level of the host, the interrupt processing function corresponding to the VEI ID in response to the received second interrupt request includes: switching to an entry address of an interrupt processing function of the kernel mode of the host, where the interrupt processing function corresponds to the second interrupt request; and executing, in the kernel mode of the host, the interrupt processing function of the kernel mode.

For the exception processing method provided in the sixth aspect and any possible implementation, refer to related descriptions of the third aspect and any possible implementation of the third aspect. Details are not described herein again.

A seventh aspect of this application provides a computer device. The computer device has a function of implementing the method in any one of the fifth aspect or the possible implementations of the fifth aspect. The function may be implemented by hardware, or may be implemented by hardware executing corresponding software. The hardware or the software includes one or more modules corresponding to the foregoing function, for example, a receiving unit and a processing unit.

An eighth aspect of this application provides a computer device. The computer device has a function of implementing the method in any one of the sixth aspect or the possible implementations of the sixth aspect. The function may be implemented by hardware, or may be implemented by hardware executing corresponding software. The hardware or the software includes one or more modules corresponding to the foregoing function, for example, a receiving unit and a processing unit.

A ninth aspect of this application provides a computer-readable storage medium storing one or more computer-executable instructions. When the computer-executable instructions are executed by a processor, the processor performs the method according to any one of the fifth aspect or the possible implementations of the fifth aspect.

A tenth aspect of this application provides a computer-readable storage medium storing one or more computer-executable instructions. When the computer-executable instructions are executed by a processor, the processor performs the method according to any one of the sixth aspect or the possible implementations of the sixth aspect.

An eleventh aspect of this application provides a computer program product that stores one or more computer-executable instructions. When the computer-executable instructions are executed by a processor, the processor performs the method according to any one of the fifth aspect or the possible implementations of the fifth aspect.

A twelfth aspect of this application provides a computer program product that stores one or more computer-executable instructions. When the computer-executable instructions are executed by a processor, the processor performs the method according to any one of the sixth aspect or the possible implementations of the sixth aspect.

A thirteenth aspect of this application provides a chip system, where the chip system includes at least one processor, and the at least one processor is configured to support an interprocess communication apparatus in implementing the function in any one of the fifth aspect or the possible implementations of the fifth aspect. In a possible design, the chip system may further include a memory. The memory is configured to store program instructions and data that are necessary for a message management apparatus. The chip system may include a chip, or may include a chip and another discrete component.

A fourteenth aspect of this application provides a chip system, where the chip system includes at least one processor, and the at least one processor is configured to support an interprocess communication apparatus in implementing the function in any one of the sixth aspect or the possible implementations of the sixth aspect. In a possible design, the chip system may further include a memory. The memory is configured to store program instructions and data that are necessary for a scheduling apparatus. The chip system may include a chip, or may include a chip and another discrete component.

In embodiments of this application, privilege level switching in a synchronous processing procedure is implemented by using the redirection apparatus, and an interrupt request may be asynchronously transferred by using the virtual event notification apparatus and the interrupt controller without passing through the kernel mode of the host. In both of the synchronous processing procedure and the asynchronous processing procedure, switching overheads are reduced, and performance of the computer device is improved.

BRIEF DESCRIPTION OF DRAWINGS

FIG. 10A and FIG. 10B are schematic diagrams of an embodiment of an interrupt processing method according to an embodiment of this application;

DESCRIPTION OF EMBODIMENTS

The following describes embodiments of this application with reference to the accompanying drawings. It is clear that the described embodiments are merely some rather than all of embodiments of this application. A person of ordinary skill in the art may learn that the technical solutions provided in embodiments of this application are also applicable to a similar technical problem as a technology develops and a new scenario emerges.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a procedure, method, system, product, or device that includes a list of operations or units is not necessarily limited to those expressly listed operations or units, but may include other operations or units not expressly listed or inherent to such a procedure, method, product, or device.

Embodiments of this application provide a computer device, an exception processing method, and an interrupt processing method, to reduce overheads generated during switching and improve performance of the computer device. This application further provides a corresponding apparatus, a computer-readable storage medium, a computer program product, and the like. Details are separately described in the following.

Virtualization means that a hardware resource (for example, storage space in a processor or memory and a network resource) at a hardware layer of a compute device is virtualized, and the virtualized resource is shared with a plurality of virtual computers. A virtual computer is a general term for running environments virtualized by using software in all types of virtualization devices, and the concept of the virtual computer includes a virtual machine or a container.

Figure 1:
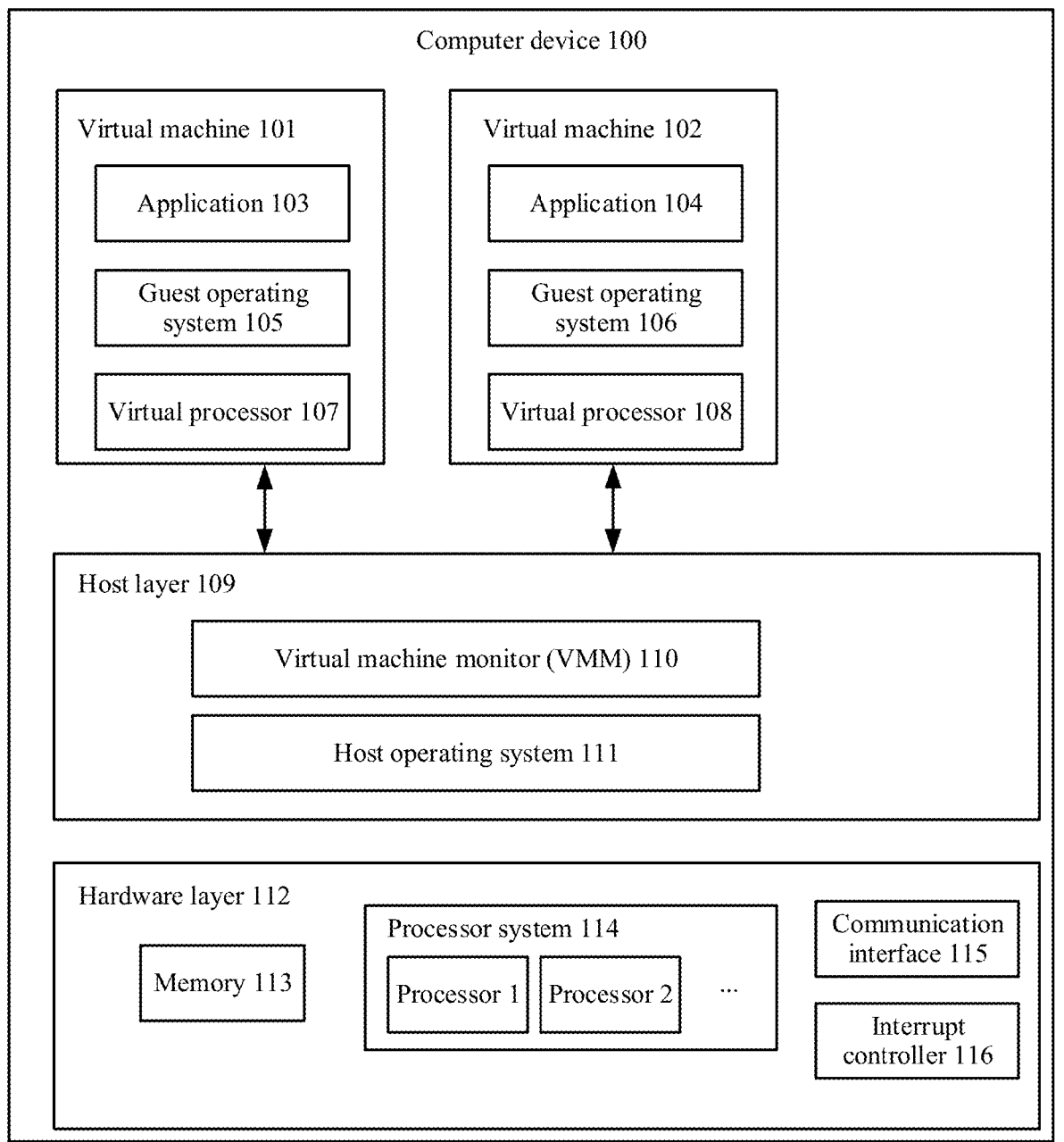
FIG. 1 is a schematic diagram of a structure of a computer device according to an embodiment of this application.

As shown in FIG. 1, a computer device 100 includes a hardware layer 112, a host layer 109, and a virtualization layer. The virtualization layer includes virtual machines 101 and 102. There may be more or fewer virtual machines. Herein, only two virtual machines are used as an example. The hardware layer 112 includes a processor system 114, a memory 113, a communication interface 115, and an interrupt controller 116.

A virtual machine (VM) is one or more virtual computers simulated on a computer device by using virtualization software. The virtual machine runs in a completely isolated environment, and works like a real computer. A guest operating system (guest OS) (105 and 106 in FIG. 1) may be installed on the virtual machine (101 and 102 in FIG. 1), and one or more applications (103 and 104 in FIG. 1) are run on the guest operating system. The virtual machine may also access a network resource. An application running on the virtual machine works as if the application works on a real computer.

When the VM is running, a virtual machine privilege level is involved. The virtual machine privilege level includes a user mode of the virtual machine and a kernel mode of the virtual machine. The kernel mode and user mode of the virtual machine are divided by considering the VM as a real computer.

Before the concepts of the user mode and kernel mode are introduced, the following first introduces user space and kernel space.

In some existing computer systems, entire virtual address space is divided, and two virtual address spaces are obtained through division as the kernel space (kernel-mode virtual address space) and the user space (user-mode virtual address space). A 48-bit valid virtual address in a 64-bit architecture is used as an example. In this case, the user space is (00000000, 00000000)-(0000FFFF, FFFFFFFF), and the kernel space is (FFFF0000, 00000000)-(FFFFFFFF, FFFFFFFF). The kernel space and the user space have corresponding registers, and the registers store independent page table base addresses of corresponding space. The kernel space may also be referred to as kernel-mode memory space, and the user space may also be referred to as user-mode memory space. A process or thread running in the user space may be referred to as a user-mode process or thread, and a process or thread running in the kernel space is referred to as a kernel-mode process or thread.

A virtual processor (for example, 107 and 108 in FIG. 1) is a physical processing unit provided to a virtual computer for use in a sharing or slicing manner in a virtualization technology, for example, a virtual CPU (vCPU). One virtual computer may be served by one or more virtual processors. When there are a plurality of virtual processors, one virtual processor is usually a primary virtual processor, and others are secondary virtual processors. Other virtual hardware resources such as a virtual memory included in the virtual machine are not shown in FIG. 1. It should be understood that the virtual machine is equivalent to an independent computer. Therefore, an action performed by the virtual machine may also be considered as that a virtual processor performs the action. The virtual processor is virtualized by using virtualization software. Running of the virtual processor is actually implemented as follows: A processor or physical core of a host reads and runs a software program. For example, a physical core reads the software program and runs the software program in a specific mode (for example, a non-root mode of x86) of hardware-assisted virtualization of the physical core, to implement the virtual processor. A plurality of virtual processors of the virtual machine may be located on different physical cores.

Trap-in and trap-out of a virtual processor: A virtualization system includes two modes: a host mode and a guest mode. The host mode may also be referred to as a privilege level of the host, for example, a user mode of the host or a kernel mode of the host. The guest mode may also be referred to as a privilege level of the VM, for example, a user mode of the VM or a kernel mode of the VM. When a virtual processor enters the guest mode, this procedure is referred to as trap-in (virtual); and when the virtual processor exits the guest mode, this procedure is referred to as trap-out (virtual). After the virtual processor traps out, a physical processor temporarily stops executing code of the virtual processor. Therefore, in this case, it may be understood as that the virtual processor is not running. When a virtual processor that runs on a physical processor traps in, it may be considered that the physical processor is in the guest mode, and code of the virtual processor is executed. When the virtual processor that runs on the physical processor traps out to the host mode, it may be considered that the physical processor is in the host mode, and runs host-related code, such as a virtual machine monitor.

The host layer 109 is used as a management layer, and is used to manage and allocate a hardware resource, present a virtual hardware platform for a virtual machine, schedule and isolate a virtual machine, and the like. In some implementations, the host layer 109 includes a host operating system 111 and a virtual monitoring apparatus, for example, a virtual machine monitor 110 (VMM). The virtual monitor 110 may be deployed inside the host operating system 111 or outside the host operating system 111. In another virtualization architecture, the virtual monitoring apparatus may also be referred to as a hypervisor or another type of virtual monitoring apparatus. In some other implementations, for example, in a virtualization architecture Xen, the host layer 109 may further include one privileged virtual machine. The virtual hardware platform provides virtual computers running on the virtual hardware platform with various hardware resources, such as a virtual processor, a virtual memory, a virtual disk, and a virtual network interface card. The virtual computers run on the virtual hardware platform prepared by the host layer for the virtual computers. The host layer 109 may also be referred to as a virtualization platform, and sometimes the host layer may also be referred to as a host for short. The privilege level of the host includes a user mode and a kernel mode.

The hardware layer 112 is a hardware platform on which a virtualized environment runs. The hardware layer may include a plurality of types of hardware. As shown in FIG. 1, the hardware layer may include a processor system 114 and a memory 113, may further include a communication interface 115, for example, a network interface card (NIC), and may further include an interrupt controller 116, an input/output (I/O) device, and the like. The processor system 114 may include one or more processors, for example, a processor 1 and a processor 2 shown in FIG. 1. Each processor may include a plurality of physical cores, and the processor may further include a plurality of registers, for example, a general-purpose register and a floating-point register.

The processor system 114 is sometimes referred to as a physical processor. A physical core represents a minimum processing unit in a processor, and a quantity of cores included in each processor may be the same or may be different. A processor having one core is referred to as single-core processor, and a processor having a plurality of physical cores is referred to as a multi-core processor. Multi-core processors can be classified into homogeneous multi-core processors and heterogeneous multi-core processors based on whether core architectures are the same. A virtual processor may be bound to a physical core. In other words, a virtual processor always runs on a specific physical core, and cannot be scheduled onto another physical core for running. In this case, the virtual processor is a bound core. If a virtual processor may be scheduled, based on a requirement, onto different physical cores for running, the virtual processor is not a bound core.

The interrupt controller 116 is disposed between a processor and hardware that triggers an interrupt request, and is mainly configured to: collect interrupt requests generated by hardware, and send the interrupt requests to the processor based on a specific priority or another rule. For example, the interrupt controller is an advanced programmable interrupt controller (APIC).

An interruption indicates that executing instructions of a current program is suspended and an interrupt service routine is executed.

The interrupt service routine (ISR) may also be referred to as an interrupt processing function, and is a program used to process an interrupt request. When receiving an interrupt request, a processor suspends executing a current program and executes an interrupt service routine corresponding to the interrupt request.

An interrupt request is an event generated by hardware. The hardware sends the event to a processor. When receiving the event, the processor suspends executing a current program and executes a routine corresponding to the event. The interrupt request generated by hardware may be triggered by the hardware, or may be triggered by software. The interrupt request is sometimes briefly referred to as an interrupt. Some hardware (such as a network adapter, an audio adapter, a mouse, and a hard disk) in a computer can complete certain work without intervention of a processor. However, the hardware still needs to use an interrupt controller to enable the processor to perform some specific work for the hardware. An interrupt number is an identifier of an interrupt request, and is represented by IRQ ID in this application.

The hardware layer 112 may further include a memory management unit (MMU). The MMU is computer hardware configured to processing a memory access request. A function of the MMU includes translation from a virtual address to a physical address (namely virtual memory management), memory protection, and control of a central processing unit cache. The MMU usually uses an associative cache of a translation lookaside buffer (TLB) to translate a virtual page number to a physical page number.

Storage space (address space) provided by the memory 113 is allocated to a virtual machine and a host for use. A host physical address (HPA) is physical address space that can be used by a local host. A host virtual address (HVA) is virtual address space that can be used by the local host. A guest physical address (GPA) is physical address space that can be used by a guest operating system of a virtual machine. A guest virtual address (GVA) is virtual address space that can be used by the guest operating system of the virtual machine.

The computer device 100 may be a physical device, for example, a server or a terminal device. The terminal device may be a handheld device with a wireless connection function, or another processing device connected to a wireless modem. For example, the terminal device may be a mobile phone, a computer (PC), a tablet computer, a personal digital assistant (PDA), a mobile Internet device (MID), a wearable device, and an e-book reader; or may be a portable, pocket-sized, handheld, computer built-in, or vehicle-mounted mobile device.

When the VM in the computer device 100 performs some operations (for example, a read/write operation on a memory of a serial port, a read/write operation on a memory of a disk, a read/write operation on a memory of a network adapter, and an operation on a page fault), an exception or interrupt is triggered (the exception is usually described as a synchronous exception, and the interrupt is usually described as an asynchronous exception). The hardware layer or a kernel of a host processes the exception or interrupt. In this embodiment of this application, an exception may be processed in a synchronous manner, and an interrupt may be processed in an asynchronous manner. Synchronous processing refers to processing on a same processor, and asynchronous processing refers to cross-processor processing. In a virtual I/O scenario, virtual I/O processing may be classified into synchronous processing and asynchronous processing. When an I/O device used in execution of the VM is a device such as a serial port, a graphics card, a character, or a USB, a synchronous processing manner is generally used. When an I/O device used in execution of the VM is a device such as a disk or a network adapter, an asynchronous processing manner is generally used.

A first processor and a second processor are used in the following embodiments of this application. It should be noted that the first processor and the second processor may alternatively be two different cores in a same multi-core processor.

The following describes the synchronous processing procedure and asynchronous processing procedure respectively.

1. Synchronization Processing

Figure 2:
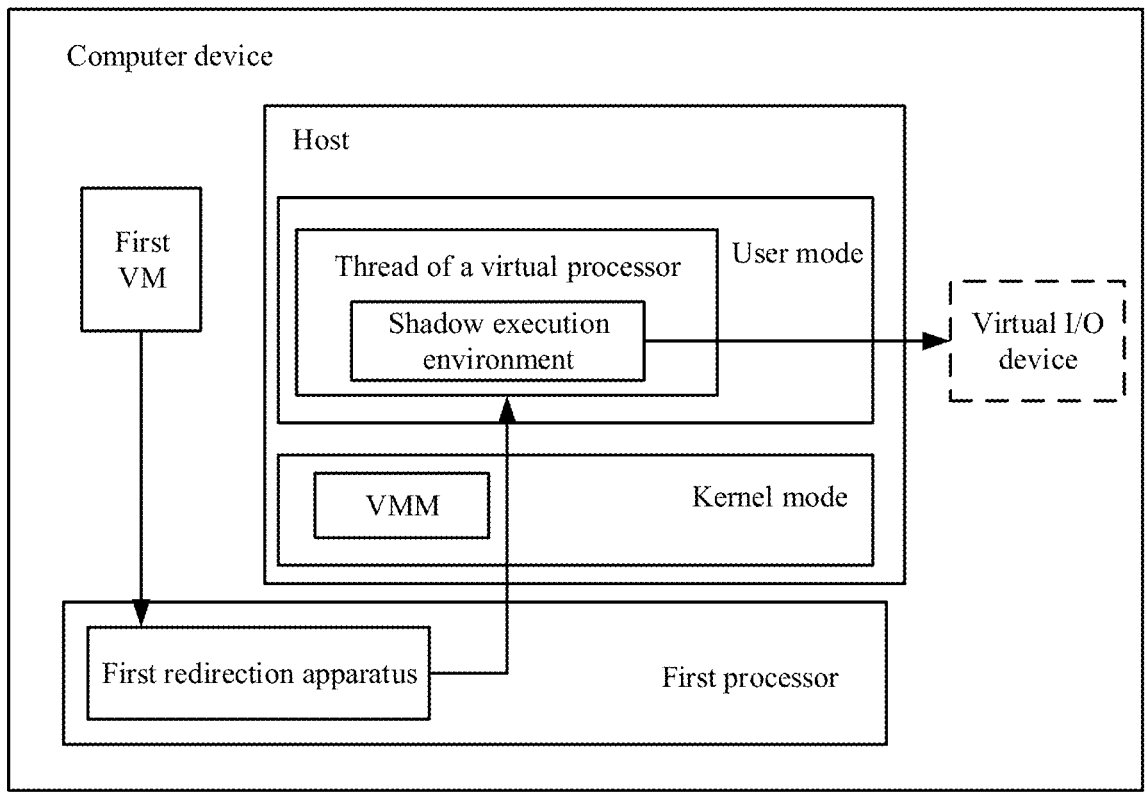
FIG. 2 is another schematic diagram of a structure of a computer device according to an embodiment of this application.

As shown in FIG. 2, the computer device includes a first processor, and a host and a first VM run on the computer device. Specifically, the first VM runs on the first processor. The first VM triggers an exception instruction when performing some operations. The exception instruction may be triggered when the VM performs an input/output (I/O) operation. The I/O operation may be an operation triggered when the VM needs to access a virtual I/O device. The virtual I/O device generally includes a front-end driver and a back-end device. The front-end driver runs on the VM, and a program of the back-end device runs on the host. If an operation performed by the VM needs to access the back-end device by using the front-end driver, the exception instruction is triggered, and the back-end device is accessed by using the exception instruction. The virtual I/O device is a type of back-end device. Accessing the virtual I/O device may be reading data from a memory of the virtual I/O device or writing data into the memory of the virtual I/O device, or may be another control operation on the virtual I/O device. The virtual I/O device is an I/O device that can be used by a virtual machine. The virtual I/O device may be a completely virtualized I/O device simulated by using software. The virtual I/O device may also be mapped to a physical I/O device in a mapping manner. When the virtual I/O device is accessed, the physical I/O device is finally accessed. The first processor receives the exception instruction, and if the first processor determines that the exception instruction needs to be processed in a user mode of the host, the first processor switches from a virtualization privilege level of the first VM to the user mode of the host, and executes an exception processing function in the user mode of the host. For example, the virtual I/O device includes a serial port, a graphics card, a character, or a USB. The serial port, the graphics card, the character, or the USB has respective address ranges. The first processor may determine, based on the address ranges, a virtual I/O device that performs a current I/O operation. In this application, operations related to the virtual I/O device are synchronously performed. If the virtual I/O device is a virtual I/O device simulated by using software, for example, a virtual serial port of a Linux system, a virtual I/O device simulated by using software may not correspond to a physical I/O device. A virtual I/O device in a virtual machine can also be associated with a physical I/O device. For example, a virtual mouse is associated with a physical mouse. When the virtual I/O device is associated with the physical I/O device, the first processor runs a thread of the user mode to trap into a kernel mode by using a system call, and then invokes a driver of the physical I/O device, to operate the physical I/O device.

There may be a plurality of types of exception instructions triggered by the first VM, for example, an invalid instruction exception, a page fault exception, a memory access exception, an address alignment exception, and an exception caused by access to a virtual I/O device. The first processor may determine, based on a type of an exception instruction, that the exception instruction needs to be processed in the user mode of the host or in the kernel mode of the host. The foregoing redirection operation may be performed for an exception instruction that needs to be processed in the user mode of the host.

The first processor may include a first redirection apparatus. The first redirection apparatus may perform a procedure of switching from a virtualization privilege level of the first VM to a privilege level of the user mode of the host, and writing an entry address of the exception processing function into a first register. In this way, the first processor may read the entry address of the exception processing function from the first register, invoke the exception processing function based on the entry address, and execute, in the user mode of the host, the exception processing function corresponding to the exception instruction. A function of the first redirection apparatus may be implemented by using a hardware circuit.

The host in the user mode may include a thread of a virtual processor (vCPU), and the thread may include a shadow execution environment. The first processor may execute the exception processing function in the shadow execution environment.

Figure 3:
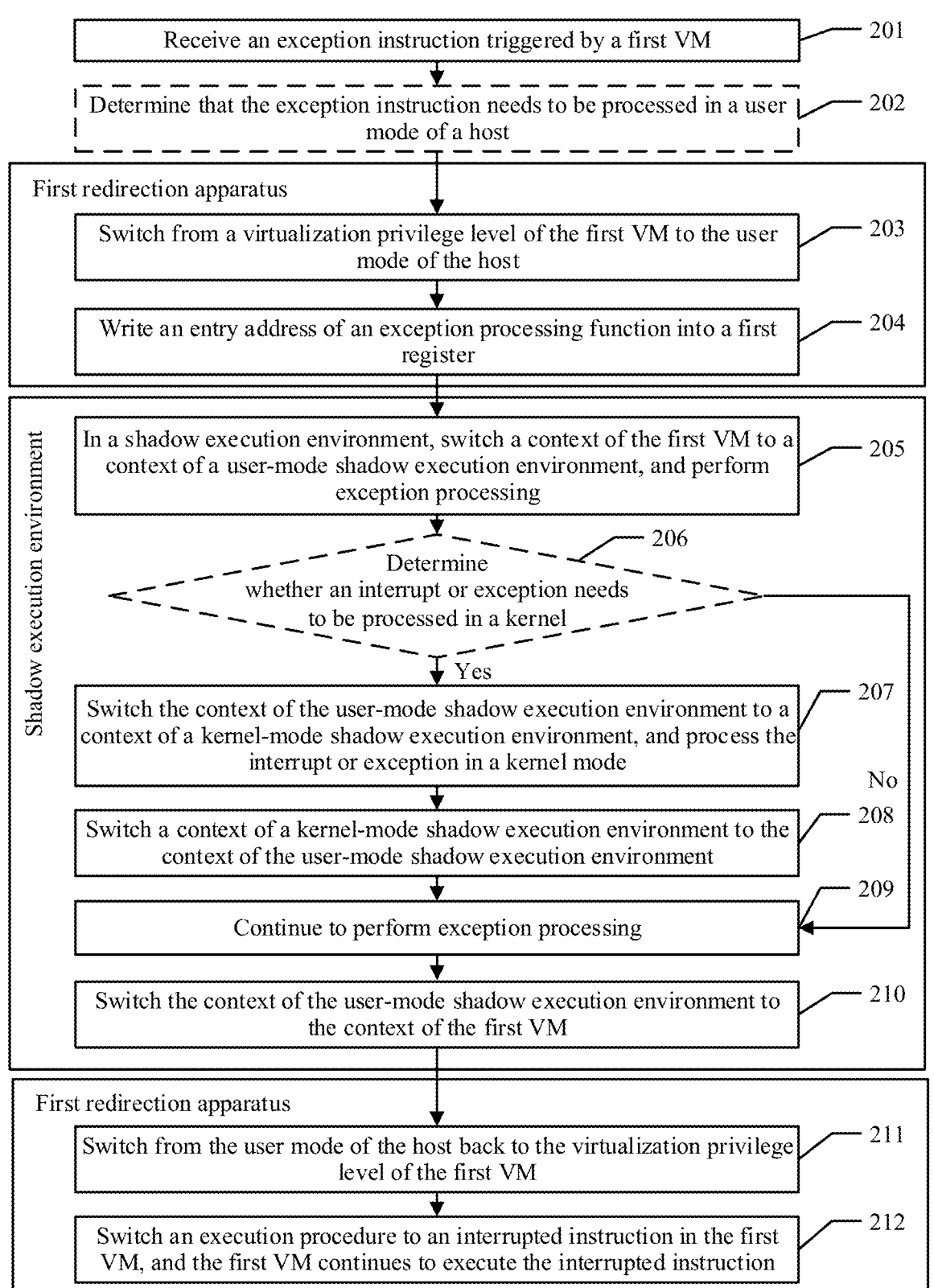
FIG. 3 is a schematic diagram of an embodiment of an exception processing method according to an embodiment of this application.

With reference to FIG. 3, the following describes a procedure of implementing the foregoing exception processing method for synchronization processing by using the first processor, the first redirection apparatus, and the shadow execution environment.

Operation 201: The first processor obtains an exception instruction triggered by a first VM.

A procedure of operation 201 may be that an exception occurs when the first VM performs an operation that is beyond permission of the first VM, and the first processor may detect exception code through hardware logic, and may further obtain the exception instruction.

After obtaining the exception instruction, the first processor may write a cause and a type of the exception, a memory to be accessed by the first VM, and a return address into a hardware register for subsequent exception processing.

Optionally, operation 202: The first processor determines that the exception instruction needs to be processed in a user mode of a host.

The first processor may determine, based on an address range of a virtual I/O device corresponding to the exception instruction, that the exception instruction needs to be processed in the user mode of the host.

If the exception instruction needs to be processed in a kernel mode of the host, the first redirection apparatus switches from a virtualization privilege level of the first VM to the kernel mode of the host, and then switches to an entry of an exception processing function of the kernel mode of the host for processing.

Operation 202 is an optional operation, that is, operation 202 may not be performed. If operation 202 is not performed, operation 203 may be directly performed.

Operation 203: The first redirection apparatus switches from the virtualization privilege level of the first VM to the user mode of the host.

The virtualization privilege level of the VM represents a privilege level in a virtualization mode, that is, a working mode of the VM. The virtualization privilege level includes a virtualized user mode and a virtualized kernel mode. Switching (directly switching) from the virtualization privilege level of the VM to the user mode of the host may include a procedure of migrating information about the virtualization privilege level of the VM out of a register used to store the privilege level, and then writing information about the user mode of the host into the register, where the register may be a system register. In this application, the privilege level and virtualization may be respectively represented by using one bit. For example, 0 indicates a user mode, 1 indicates a kernel mode, 0 indicates non-virtualization, and 1 indicates virtualization. The privilege level is in a first bit, and whether to virtualize is in a second bit. For example, 00 indicates a non-virtualized user mode, which may also be referred to as a user mode of a host; 10 indicates a non-virtualized kernel mode, which may also be referred to as a kernel mode of a host; 01 indicates a virtualized user mode, which may also be referred to as a user mode of a VM; and 11 indicates a virtualized kernel mode, which may also be referred to as a kernel mode of a VM. Certainly, the foregoing are merely several examples. A sequence of privilege levels and virtualization, and other possible representation forms are not limited in this application.

Operation 204: The first redirection apparatus writes the entry address of the exception processing function into a first register.

Operation 205: The first processor switches, in the shadow execution environment, from a context of the first VM to a context of the user-mode shadow execution environment, and performs exception processing.

The shadow execution environment is a carrier of an exception processing function in the user mode, and the exception processing function may also be referred to as a service routine for processing an exception interrupt.

The exception processing function is included in a thread of a virtual processor that runs in a user mode of the host, an execution environment allocated to the thread of the virtual processor includes a main thread execution environment, an execution environment of the VM, the shadow execution environment, the execution environment allocated to the thread of the virtual processor is a resource required for running the thread of the virtual processor, and the shadow execution environment has user-mode memory space independent of the main thread execution environment and the execution environment of the VM. The shadow execution environment is used to execute the exception processing function, and the exception processing function is used to process an exception that triggers the exception instruction.

Optionally, operation 206: In a procedure of processing the exception, determine whether an interrupt or an exception that needs to be processed in a kernel is generated; if the interrupt or the exception that needs to be processed in the kernel is generated, perform operation 207; and if the interrupt or the exception that needs to be processed in the kernel is not generated, perform operation 209.

Operation 207: If the interrupt or the exception that needs to be processed in the kernel is generated, switch the context of user-mode shadow execution environment to a context of a kernel-mode shadow execution environment, and process the interrupt or the exception in the kernel mode.

Operation 208: The context of the kernel-mode shadow execution environment needs to be switched to the context of the user-mode shadow execution environment after the interrupt or the exception is processed by the kernel.

Operation 209: Continue to process the exception.

Operation 210: Switch the context of the user-mode shadow execution environment to the context of the first VM after the interrupt or the exception is processed.

Operation 211: The first redirection apparatus switches from the user mode of the host back to a virtualization privilege level of the first VM.

In the switching procedure, information about the user mode of the host is migrated out of a privilege register, and information about a virtualization privilege level of the first VM that is originally stored in a memory corresponding to the privilege register or a register is written into the privilege register.

Operation 212: The first redirection apparatus switches an execution procedure to an interrupted instruction in the first VM, and the first VM continues to execute the interrupted instruction.

Figure 4:
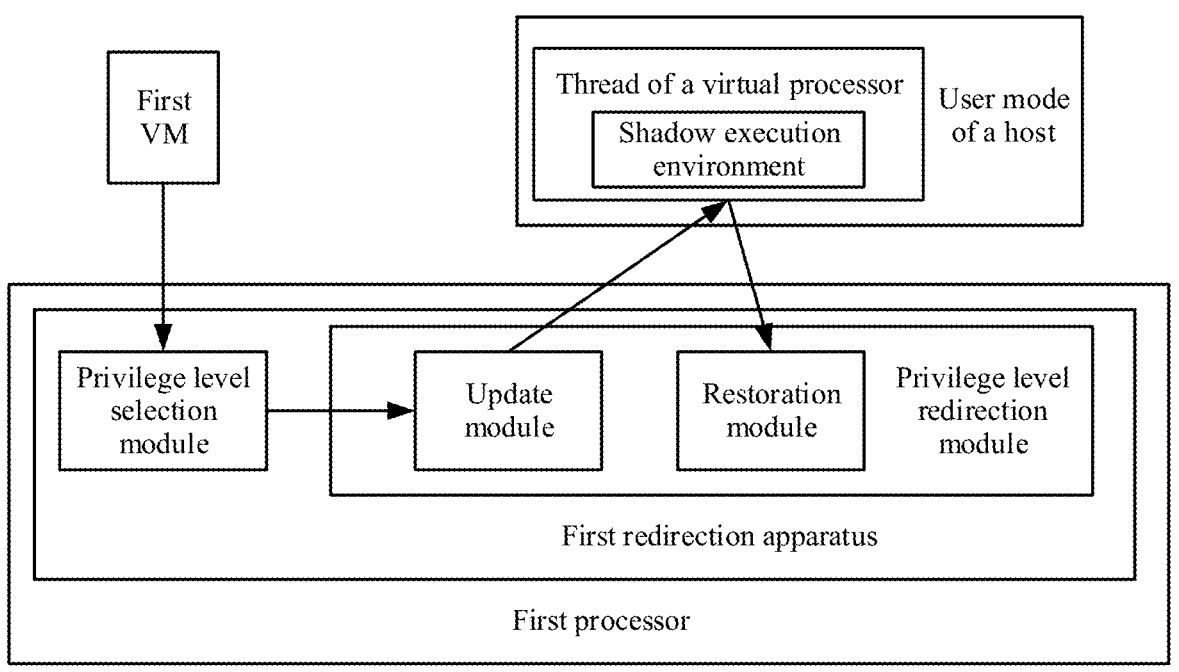
FIG. 4 is a schematic diagram of a structure of a processor according to an embodiment of this application.

The foregoing describes a synchronization processing procedure. In the synchronization processing procedure, as shown in FIG. 4, the first redirection apparatus may include a privilege level selection module and a privilege level redirection module. The privilege level redirection module may further include an update module and a restoration module.

The privilege level selection module may be configured to determine whether an exception instruction triggered during running of the first VM needs to be redirected to the user mode of the host for processing.

If the exception instruction needs to be redirected to the user mode of the host, the privilege level selection module notifies the privilege level redirection module to perform a redirection operation. For a redirection procedure, refer to the description of operation 204.

The update module is configured to:

(1) record switching information, where the switching information includes information about the virtualization privilege level of the first VM before switching and information about the user mode of the host after switching;

(2) update state control information, that is, update information of a state register to related information of the exception processing function of the user mode, where the related information includes but is not limited to an entry address of the exception processing function, a cause of an exception, a memory address or instructions of the exception, and the like; and (3) switch a privilege level, that is, switch the virtualization privilege level of the first VM to the user mode of the host, and switch to the entry address of the exception processing function of the user mode of the host.

The restoration module is configured to: switch from the user mode of the host back to the virtualization privilege level of the first VM based on recorded information about the virtualization privilege level of the first VM, and switch, based on a return address, to instructions that are interrupted by the first VM, so that the first VM continues to execute the instructions.

The shadow execution environment includes a user-mode shadow execution environment and a kernel-mode shadow execution environment. To be specific, the shadow execution environment has independent storage space that can store context information in both of the user mode and the kernel mode. The storage space may be a stack, the storage space in the user mode may be a stack in the user mode, and the storage space in the kernel mode may be a stack in the kernel mode.

The shadow execution environment is located in an execution environment of a thread of the virtual processor. For a task structure of the thread of the virtual processor, refer to FIG. 5.

Figure 5:
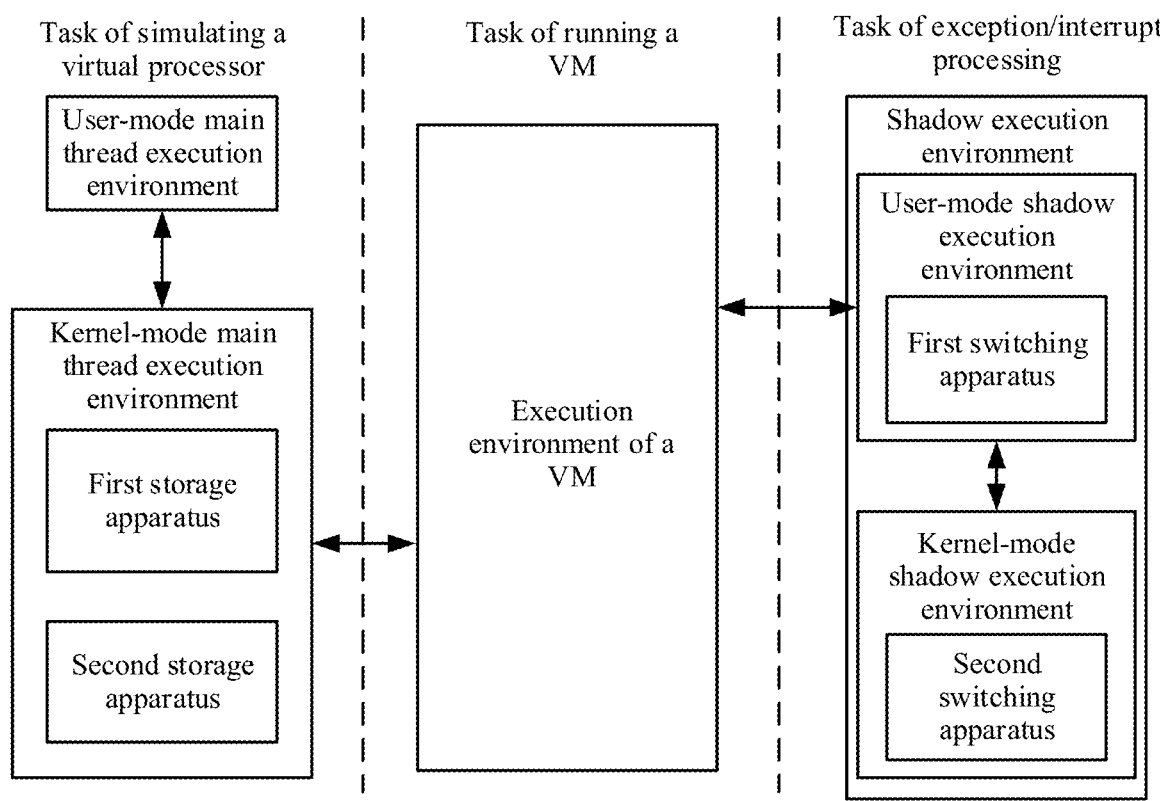
FIG. 5 is a schematic diagram of a structure of a thread of a virtual processor according to an embodiment of this application.

As shown in FIG. 5, the task of the thread of the virtual processor may include: a task of simulating the virtual processor, a task of running a VM, and a task of exception/interruption processing.

A main thread execution environment of a user mode of a vCPU and a main thread execution environment of a kernel mode of a vCPU are used in the task of simulating the virtual processor. The main thread execution environment of the user mode of the vCPU includes a first storage apparatus and a second storage apparatus. The first storage apparatus is configured to store a user mode context or a kernel mode context, and the second storage apparatus is configured to store a host context or a VM context.

A VM execution environment is used in the task of running the VM, and the VM execution environment is used to run the VM.

A shadow execution environment is used in the task of interrupt processing. The shadow execution environment includes a user-mode shadow execution environment and a kernel-mode shadow execution environment. The user-mode shadow execution environment includes a first switching apparatus, and the kernel-mode shadow execution environment includes a second switching apparatus.

The first switching apparatus is configured to switch from a context of a VM to a context of the user mode of the host, as described in the foregoing operations 205 and 210. The first switching apparatus stores a running status of the VM, and restores a running status of the user mode of the shadow execution environment. Information about the running status includes but is not limited to information in registers such as a general-purpose register, a floating-point register, and a system register.

The second switching apparatus is configured to switch from the context of the user mode of the host to a context of a kernel mode of the host, as described in the foregoing operations 207 and 208. The second switching apparatus is configured to: store the context of the user mode of the host, restore the context of the kernel mode, enter the kernel mode, and process an interrupt or an exception that occurs during the user mode of the shadow execution environment and that needs to be processed in the kernel mode. After the interrupt or the exception is processed in the kernel mode, the apparatus restores the context of the user mode, and switches back to the shadow execution environment of the user mode, to continue to execute the exception instruction. The context of the shadow execution environment of the kernel mode and a context of a kernel mode of the thread of the virtual processor do not conflict with each other or do not affect each other.

The apparatus for storing contexts of the user mode and the kernel mode, the apparatus for storing contexts of the host and the VM, the apparatus for switching between contexts of the VM and the shadow execution environment of the user mode, and the apparatus for switching between contexts of the user mode and the kernel mode may be a general-purpose register, a floating-point register, a system register, or the like.

The "execution environment" in this application includes two aspects: a software execution environment and a hardware execution environment. The software execution environment includes information in stacks used when threads of the virtual processor run in different execution environments, and context information of the threads. The hardware aspect includes hardware resources used when the threads run, including memory resources or processing resources.

According to the computer system provided in this embodiment of this application, an exception that occurs during running of a VM is redirected, in a synchronous processing manner, to the user mode of the host for processing. Therefore, overheads of switching between the kernel mode of the host and the user mode of the host are not required, and performance of the computer system is improved.

2. Asynchronous Processing

Asynchronous processing refers to a cross-processor processing procedure. A first VM running on a first processor needs to perform an operation that accesses a back-end device of the first VM and triggers an interrupt request. The interrupt request needs to be processed by using a second processor. Therefore, an asynchronous processing procedure may be divided into an interrupt request transmit end procedure and an interrupt request receive end procedure. The transmit end procedure may not include a kernel of a host, or may include the kernel of the host. The receive end procedure may not include the kernel of the host, or may include the kernel of the host. There may be the following four asynchronous processing manners:

Asynchronous processing manner 1: A transmit end procedure does not include a kernel of a host, and a receive end procedure does not include the kernel of the host either.

Figure 6:
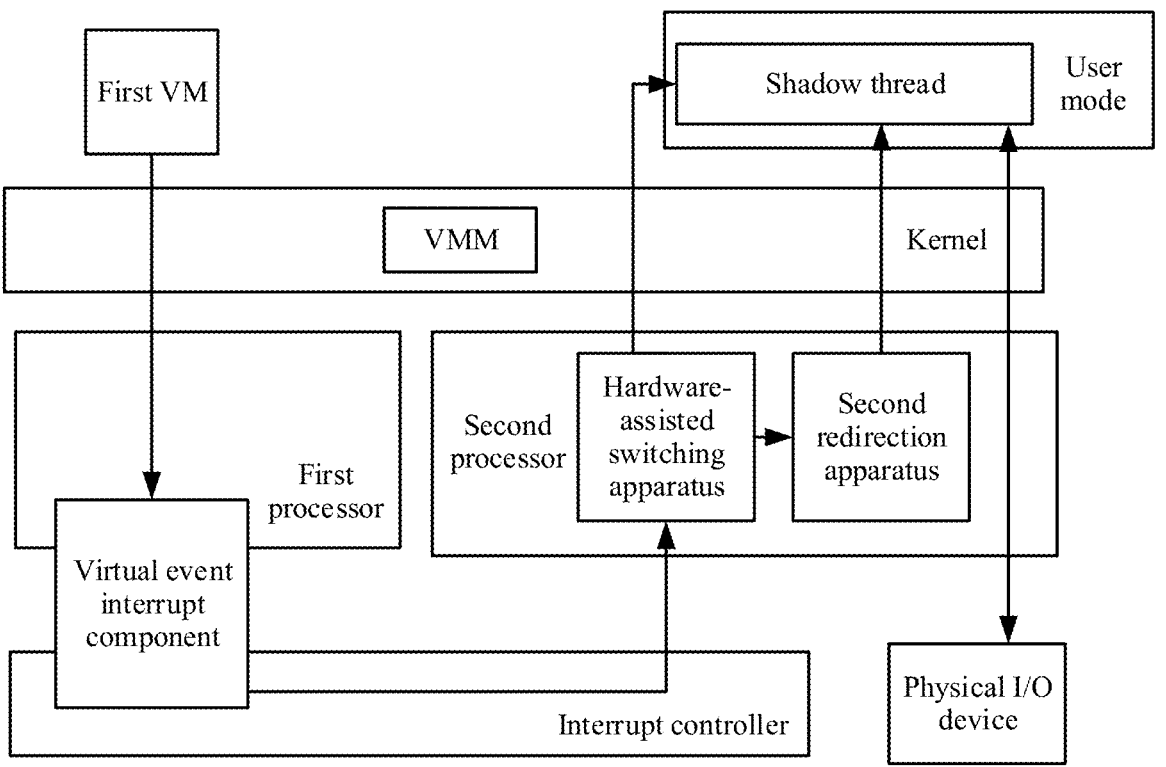
FIG. 6 is another schematic diagram of a structure of a computer device according to an embodiment of this application.

As shown in FIG. 6, a computer system includes a first processor, a second processor, an interrupt controller, and a physical I/O device. A host (host) runs on the computer device, and a first virtual machine VM runs on the first processor. The computer system further includes a virtual event interrupt component. The virtual event interrupt component may include a virtual event notification apparatus and a virtual event interrupt apparatus. A circuit structure of the virtual event notification apparatus is located in the first processor, and a circuit structure of the virtual event interrupt apparatus is located in the interrupt controller.

The first processor is configured to receive a first interrupt request triggered by the first VM, where the first interrupt request is used to request to execute an interrupt processing function. The virtual event notification apparatus is configured to directly send interrupt information to the interrupt controller in response to the first interrupt request. The interrupt controller is configured to: determine an identifier of the second processor based on the interrupt information, and send a second interrupt request to the second processor based on the identifier of the second processor. The second processor is configured to execute the interrupt processing function in response to the received second interrupt request.

Figure 7A:
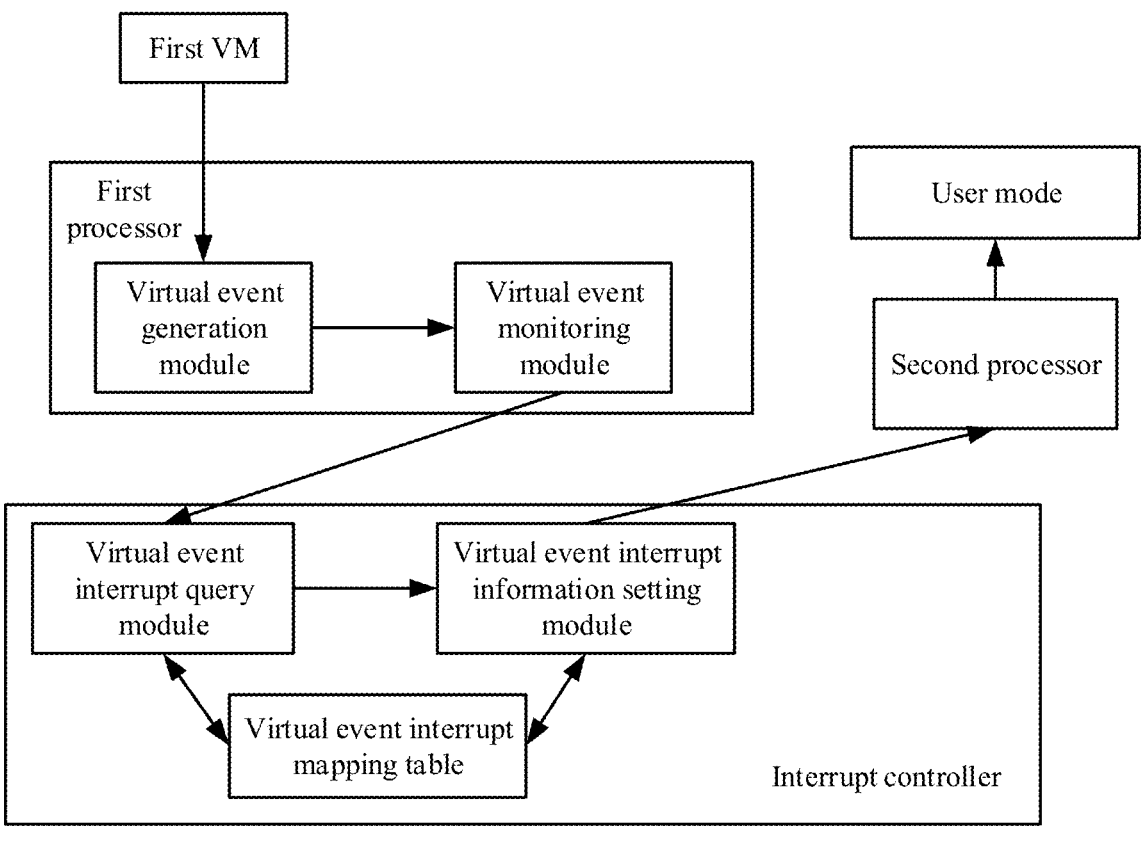
FIG. 7A is another schematic diagram of a structure of a computer device according to an embodiment of this application.

A structure of the virtual event interrupt component may be understood with reference to FIG. 7A. As shown in FIG. 7A, the virtual event interrupt component includes a virtual event generation module, a virtual event monitoring module, a virtual event interrupt mapping table, a virtual event interrupt query module, and a virtual event interrupt information setting module. The virtual event generation module and the virtual event monitoring module are located in the first processor, and the virtual event interrupt mapping table, the virtual event interrupt query module, and the virtual event interrupt information setting module are located in the interrupt controller.

The virtual event generation module may include a VEI-REG register that can be directly accessed by the first VM. In this way, when the first VM accesses the virtual event generation module, the VM may write a virtual event interrupt request number (virtual event interrupt identifier, VEI ID) into the VEI-REG register. A manner in which the first VM accesses the virtual event generation module includes but is not limited to reading and writing a dedicated register, executing a dedicated instruction, executing an existing instruction to trigger dedicated hardware logic, and the like.

The VEI ID identifies a virtual event that causes the first VM to trigger the first interrupt request. Generally, types of interrupts triggered by the VM may further include a local interrupt, an external interrupt, a clock interrupt, and the like. If the VEI ID indicates that the interrupt request is an interrupt triggered by a virtual event, the virtual event generation module notifies the virtual event monitoring module to start working. The virtual event monitoring module queries a number of the first VM, that is, a virtual machine identifier (VM ID). The virtual event monitoring module may obtain the VM ID from a register for storing the virtual machine identifier. The VM ID is written into the register for storing the virtual machine identifier when the first VM runs on the first processor. The register for storing the virtual machine identifier may be a control state register (CSR(s)). The interrupt information includes the VEI ID and the VM ID.

The virtual event monitoring module sends the VEI ID and the virtual machine identifier (VM ID) of the first VM to the virtual event interrupt query module.

In this embodiment of this application, to prevent the first VM from trapping out to the host, a VEI-REG register that can be directly accessed by the VM is newly added. The VM may write the VEI ID into the VEI-REG register, so that the first processor may read the VEI ID by using the VEI-REG register, then the first processor reads the VM ID from the CSRs register, and further asynchronously performs subsequent interrupt processing by using the interrupt controller and the second processor. After the first VM writes the VEI ID into the VEI-REG register, because a subsequent interrupt procedure is performed asynchronously, the first VM does not need to exit, and may continue to run.

The virtual event interrupt mapping table maintains the VEI ID, the VM ID, a processor ID (CPU ID), and a VEI physical number, and further maintains a mapping relationship between the VEI ID and a privilege level (the interrupt request should be processed in a user mode or a kernel mode) of a host corresponding to an interrupt request corresponding to the VM ID. The VEI ID indicates a virtual event interrupt of a virtual machine, and the VEI physical number is used by a processor to identify the virtual event interrupt. The VEI ID ranges from 0 to 63, and the VEI physical number ranges from 0 to 2047. In this embodiment of this application, the VEI ID identifies a virtual event that occurs in the virtual machine, and the VEI physical number indicates an identifier of the virtual event in the host. There is a mapping relationship between the VEI ID and the VEI physical number. A VEI ID and a VEI physical number that are mutually mapped indicate a same virtual event (for example, a disk read/write event or a network adapter read/write event). The VEI ID may be represented by a value, for example, 0 to 63. Each value identifies a different virtual event. One I/O device may have a plurality of different virtual events. For example, a disk read event may be represented by a value 1, a disk write event may be represented by a value 2, a disk control event may be represented by a value 3, a network adapter read event may be represented by a value 4, a network adapter write event may be represented by a value 5, and the like. A same virtual event in each virtual machine may use a same VEI ID. The VEI physical number may be globally unique, and virtual events of a same VEI ID that occur on different virtual machines may correspond to different VEI physical numbers. For example, a VEI physical number corresponding to a value range of a VEI ID of a VM 1 may be 0 to 63, a VEI physical number corresponding to a value range of a VEI ID of a VM 2 may be 64 to 127, and the rest may be deduced by analogy. In this way, the second processor may determine, based on ranges of different VEI physical numbers, a virtual machine on which a virtual event occurs, and then determine, based on a specific value of a VEI physical number, a virtual event that occurs on the VM. For example, a VEI ID being 5 indicates a disk read event, and if a VEI physical number being 5, it indicates that a disk read event occurs on the VM 1. If a VEI physical number being 69, it indicates that a disk read event occurs on the VM 2. A correspondence between a virtual event and a VEI ID and a correspondence between a VEI physical number and a virtual machine may be set based on a requirement. This is not limited in this application.

The virtual event interrupt mapping table further maintains information (which may also be referred to as service routine information) of an interrupt processing function corresponding to a virtual event interrupt, and the information includes but not limited to a memory address space, data structure information, a processing privilege level, and the like of the service routine.

The virtual event interrupt query module checks whether a VEI ID is registered or exists by searching a virtual event interrupt mapping table. If the VEI ID is registered or exists, the virtual event interrupt query module transfers the VIE ID and the VM ID to the virtual event interrupt information setting module. If the VEI ID is not registered or does not exist, the interrupt request is ignored or an exception is thrown.

The virtual event interrupt information setting module queries the virtual event interrupt mapping table based on the VEI ID and the VM ID, and determines a CPU ID of the second processor corresponding to a current interrupt request, a VEI physical number, and a privilege level of a corresponding host.

In this application, because a same virtual event in each virtual machine may use a same VEI ID, to distinguish between virtual machines on which the virtual event occurs, the first processor may obtain a VM ID, where the VM ID may be read by the first processor from a register for storing a virtual machine identifier. Then, the virtual event notification apparatus sends the VEI ID and the VM ID to the interrupt controller, and the interrupt controller may search for the identifier of the second processor, the VEI physical number, and the privilege level of the corresponding host based on the VEI ID and the VM ID. The interrupt controller may maintain a mapping table whose input is (VEI ID)+(VM ID) and output is (CPU ID)+(VEI physical number)+(privilege level of a host). The interrupt controller can directly determine a corresponding (CPU ID)+(VEI physical number)+(privilege level of a host) based on the mapping table. The interrupt controller may determine, based on the CPU ID, the second processor that subsequently performs asynchronous interrupt processing, and may determine, based on the privilege level of the host, whether to use a user-mode processing manner or a kernel-mode processing manner subsequently. The second processor may read the VEI physical number from a register that stores the VEI physical number, and then perform corresponding processing based on a user-mode processing procedure or a kernel-mode processing procedure.

The VM ID and the VEI physical number are used in the foregoing manner. If the VEI ID is globally unique, different VMs use different VEI IDs for a same virtual event. In this way, the VM ID does not need to be used, the VEI physical number does not need to be converted, and subsequent interrupt processing can be performed provided that the identifier of the corresponding second processor and the privilege level of the host are determined based on the VEI ID. In this embodiment, the interrupt information includes the VEI ID, and the VM ID is no longer required.

If the interrupt request needs to be processed in the user mode of the host, the virtual event interrupt information setting module sets information about an interrupt processing thread of the user mode in the second processor. If the interrupt request needs to be processed in the kernel mode of the host, the virtual event interrupt information setting module notifies the second processor to process a kernel interrupt.

In this embodiment of this application, the interrupt request needs to be processed in the user mode of the host. Therefore, after the virtual event interrupt information setting module sets the information about the interrupt processing thread in the user mode, the virtual event interrupt information setting module notifies the second processor to process the interrupt request in the user mode.

After receiving the interrupt request in the user mode, the second processor performs corresponding interrupt processing.

Figure 7B:
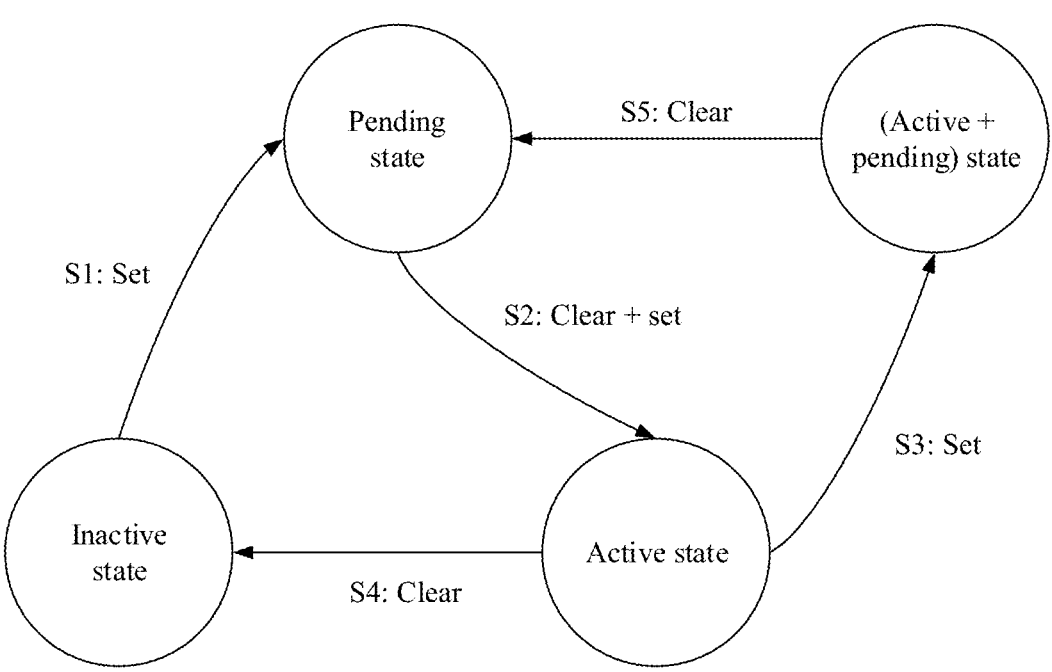
FIG. 7B is a schematic diagram of an interrupt state change according to an embodiment of this application.

In this embodiment of this application, the interrupt controller further maintains, by using two registers, a state machine indicating a virtual event interrupt VEI. Each VEI ID corresponds to a state machine. There are four states of the state machine at different stages of processing an interrupt: an inactive state, a pending state, an active state, and a (active+pending) (pending and active) state shown in the FIG. 7B. The active state may also be understood as a processing state, and the (active+pending) state indicates that a current interrupt is still being processed and a new interrupt comes.

One register (for example, a register 1) of the two registers is configured to store a value indicating whether the state machine is in the active state, and the other register (for example, a register 2) is configured to store a value indicating whether the state machine is in the pending state. It may also be understood that the four states are represented by using two bits. For example, a first bit indicates whether the state machine is in the pending state, and 1 may indicate that the state machine is in the pending state. A second bit indicates whether the state machine is in the active state, 0 may indicate that the state machine is in the inactive state, and 1 may indicate that the state machine is in the active state. In this way, the inactive state may be represented by 00, the pending state may be represented by 10, the active state may be represented by 01, and the (active+pending) state may be represented by 11.

When the interrupt controller does not obtain a first interrupt request, state values in the register 1 and the register 2 are both 0, that is, a state value of the inactive state is 00.

S1: If the interrupt controller obtains an interrupt request 1, the interrupt controller needs to switch to the pending state, and sets a state value in the register 1 to 1.

In this way, the state value in the register 1 is 1, and a state value in the register 2 is 0, that is, a state value of the pending state is 10.

S2: The interrupt controller starts to process the 1 interrupt request 1, and needs to switch to the active state. In this case, the state value in the register 1 is cleared, that is, restored to 0, and a state value in the register 2 is set to 1.

In this way, the state value in the register 1 is 0, and the state value in the register 2 is 1, that is, a state value of the active state is 01.

S3: If the interrupt controller receives another interrupt request 2 when processing the interrupt request 1, the interrupt controller needs to switch to the (active+pending) state, and sets the state value in the register 1 to 1.

In this way, the state value in the register 1 is 1, and the state value in the register 2 is 1, that is, a state value of the pending state is 11.

S4: If the interrupt controller needs to switch to the inactive state after processing the interrupt request 1, the state value in the register 1 and the state value in the register 2 need to be cleared.

The state values in the register 1 and the register 2 are both 0, that is, a state value of the inactive state is 00.

S5: If the interrupt controller changes from the (active+pending) state to the pending state, the state value in the register 2 needs to be cleared.

In this way, the state value in the register 1 is 1, and state value in the register 2 is 0, that is, a state value 10 of the pending state is returned.

In this application, in the interrupt controller, one state machine is maintained by using two registers, so that the interrupt controller can continuously obtain a state of processing an interrupt. This helps quickly enter processing of a next interrupt after processing of one interrupt is completed.

Figure 8:
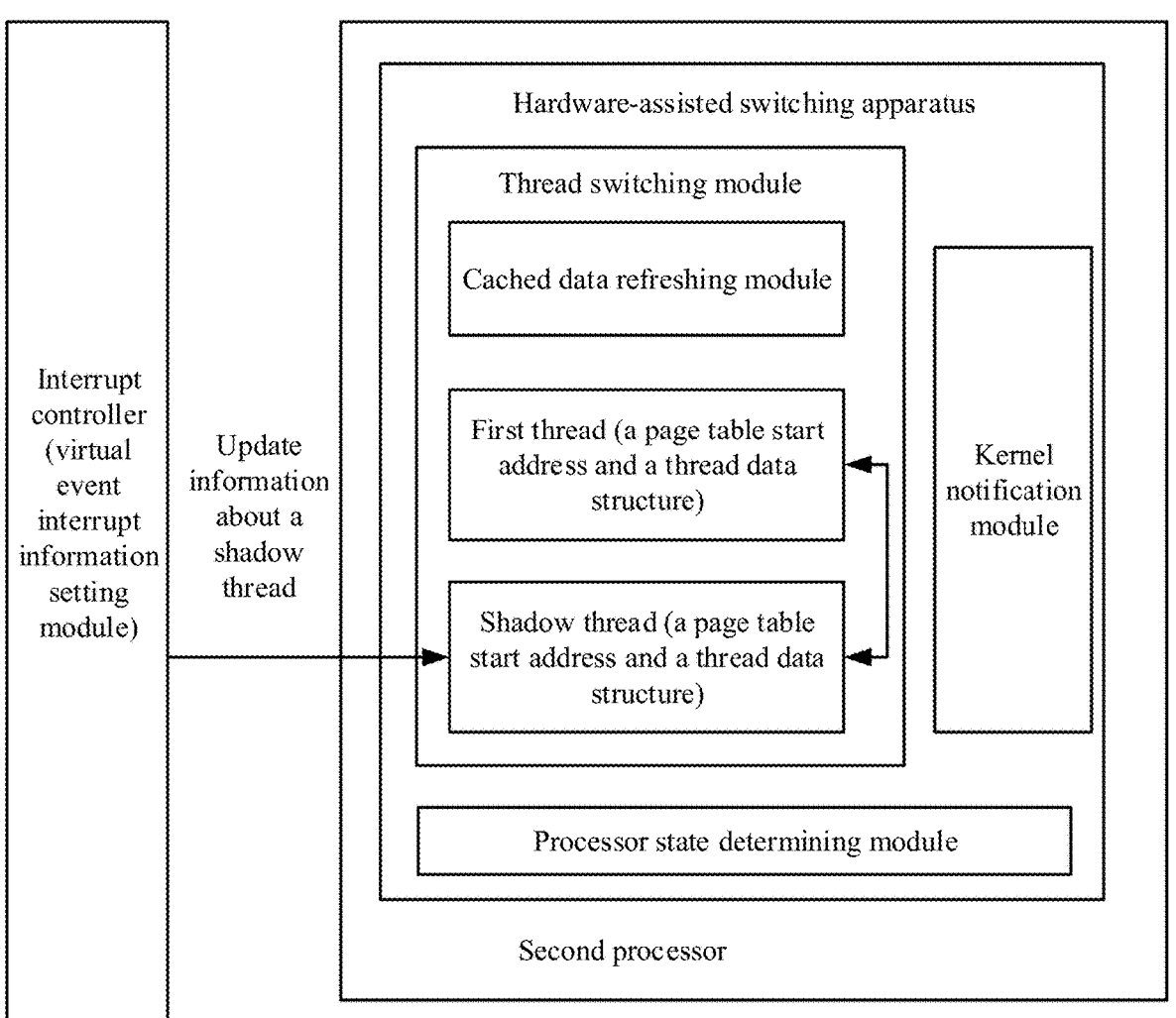
FIG. 8 is another schematic diagram of a structure of a computer device according to an embodiment of this application.

As shown in FIG. 6, the second processor includes a hardware-assisted switching apparatus and a second redirection apparatus. A structure of the hardware-assisted switching apparatus may be understood with reference to FIG. 8. As shown in FIG. 8, when processing a user-mode interrupt, the hardware-assisted switching apparatus may support thread switching without being trapped in a kernel. The hardware-assisted switching apparatus includes a processor state determining module, a thread switching module, and a kernel notification module.

The processor state determining module is configured to determine whether a current state of the processor supports immediately responding to an interrupt of a user mode. The processor determines, based on the current state of the processor, to run a shadow thread in the user mode to respond to the interrupt in a thread switching manner or a kernel notification manner.

The thread switching module includes information about the shadow thread, information about a first thread, and a thread-related cached data refreshing module. The shadow thread is a thread running in a host in the user mode, and is configured to execute an interrupt processing function. The first thread is a thread that is run by a second processor before the second processor switches information about the thread, and information about the shadow thread may be logically updated by using software or hardware running on another processor. When thread information is switched, information about the first thread is stored in a first thread information module. When user-mode interrupt processing is completed, related information about the first thread is restored from the first thread information module. If the cached data refreshing module does not support identification of a process or virtual machine information, after thread information switching is completed, cache information related to a thread needs to be refreshed by using the cached data refreshing module. If the cached data refreshing module supports identification of a process or virtual machine information, the cached data refreshing module may not be triggered to perform execution.

When the second process is currently in a state in which the second processor cannot respond to the user-mode interrupt in time, such as a case but is not limited to when the second processor processes a kernel mode interrupt or exception, the processor is in an idle state, and the like, a manner including but not limited to generating an existing or newly added interrupt or exception is used to notify the kernel to wake up the shadow thread for execution.

When the second processor determines that the first thread is at a virtualization privilege level, the second redirection apparatus completes updating state control information related to the shadow thread, and then switches the virtualization privilege level to the user mode of the host.

Figure 9:
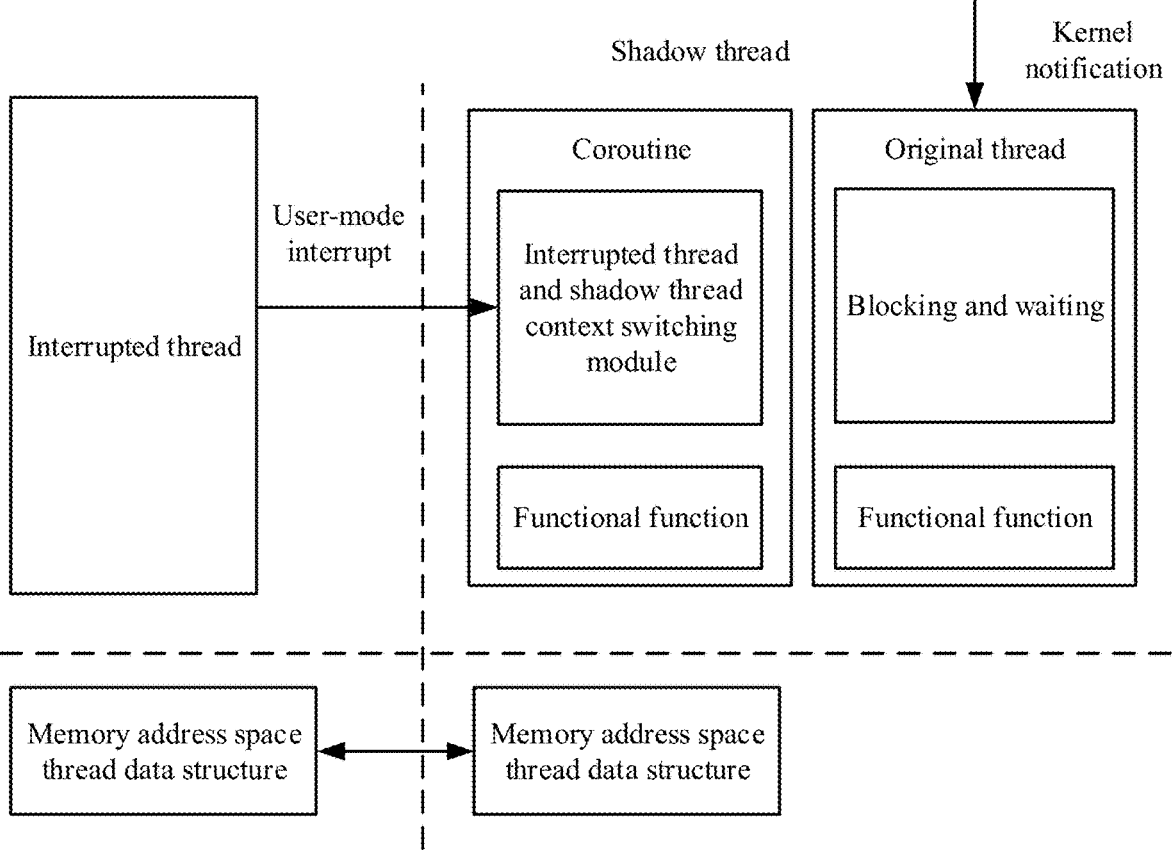
FIG. 9 is a schematic diagram of a structure of a shadow thread according to an embodiment of this application.

The "processing the interrupt request in the user mode" in the foregoing description may be that the second processor runs the shadow thread in the user mode to respond to and process the user-mode interrupt. As shown in FIG. 9, the shadow thread includes an original thread and a coroutine that implements a double-layer switching mechanism.

After being created, the original thread blocks sleep and can also be woken up by the kernel to execute a functional function of a user-mode interrupt service routine.

The double-layer switching mechanism includes a hardware-assisted switching apparatus, and a first thread and a shadow thread context switching module. If the processor can respond to a user-mode interrupt, information (including but not limited to a memory address space, a data structure, and the like) required for coroutine running is switched by using the hardware-assisted switching apparatus, context switching between the first thread and the shadow thread may be implemented by using the first thread and the shadow thread context switching module. A coroutine of the shadow thread further invokes a function of the user-mode interrupt service routine to respond to and process the user-mode interrupt.

Figure 10A:
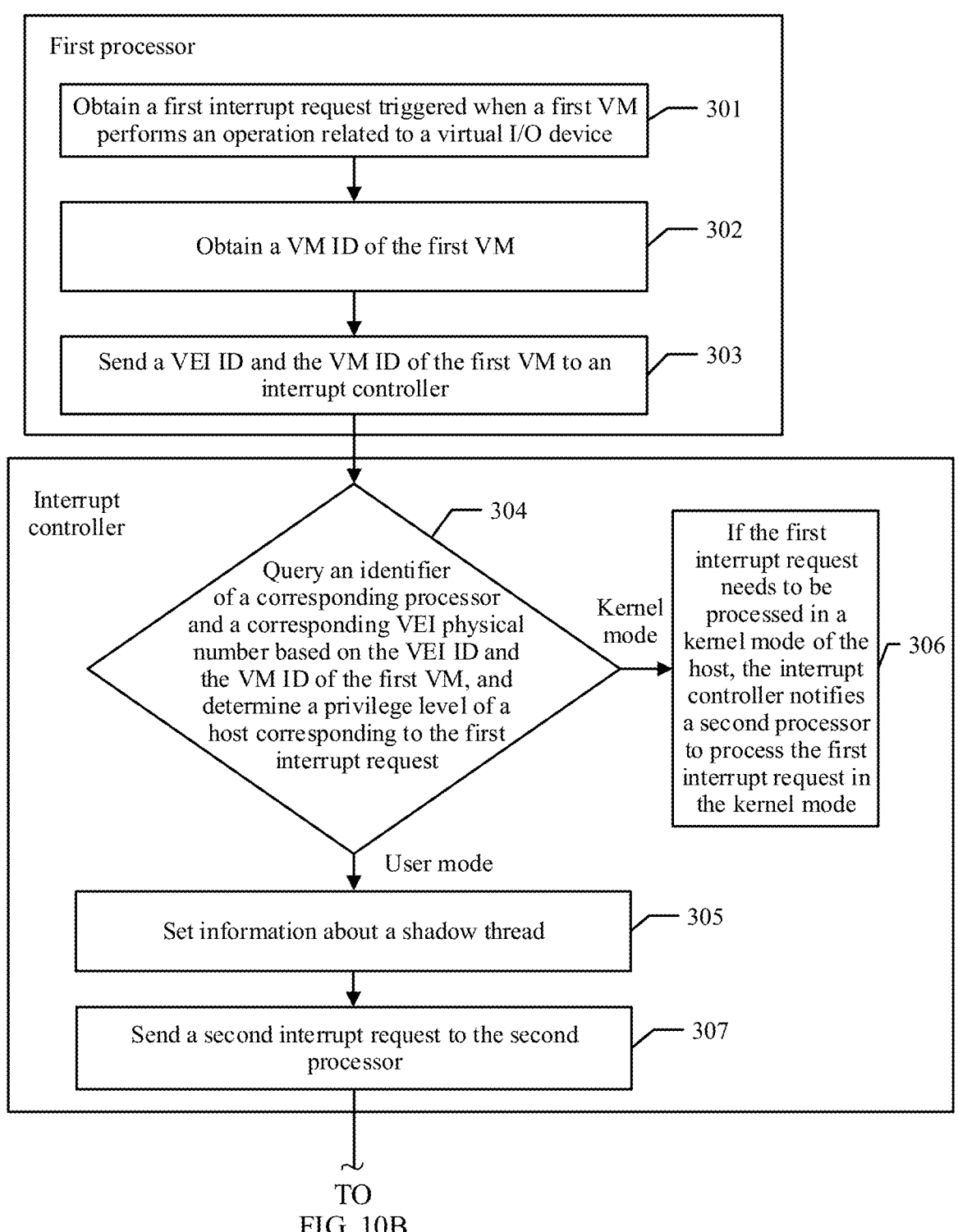

The foregoing describes an asynchronous processing procedure from a perspective of a hardware function. The following describes a procedure of an interrupt processing method with reference to FIG. 10A and FIG. 10B.

Operation 301: A first processor obtains a first interrupt request triggered when a first VM performs an operation related to a virtual I/O device.

A procedure of operation 301 may be that an interrupt occurs when the first VM performs an operation beyond permission of the first VM, and the first processor may detect interrupt code by using hardware logic, and may further obtain the first interrupt request.

That the first interrupt request includes a VEI ID may be that the first VM writes the VEI ID into a register for storing the VEI ID, and the first processor reads the VEI ID from register for storing the VEI ID.

Operation 302: The first processor obtains a VM ID of the first VM.

The first processor may obtain the VM ID from a register for storing a virtual machine identifier, where the VM ID is written into the register for storing the virtual machine identifier when the first VM runs on the first processor.

Operation 303: The first processor sends the VEI ID and the VM ID of the first VM to an interrupt controller.

Operation 304: The interrupt controller queries a corresponding processor identifier and a corresponding VEI physical number based on the F and the VM ID of the first VM, and determines a privilege level that is of a host and that is corresponding to the first interrupt request.

A query procedure may be understood with reference to Table 1.

TABLE 1

| Mapping table | | | | |
| --- | --- | --- | --- | --- |
| VEI ID | VM ID | CPU ID | VEI physical number | Privilege level of a host |
| VEI 1 | VM 1 | CPU 2 | VEI 100 | User mode |
| VEI 2 | VM 1 | CPU 2 | VEI 101 | Kernel mode |
| . . . | . . . | . . . | . . . | . . . |

It can be learned from Table 1 that a corresponding CPU ID, A VEI physical number, and A privilege level of A host may be queried by using the VEI ID, the VM ID, and a mapping relationship in Table 1.

If the corresponding processor identifier and THE VEI physical number are found, operation 305 is performed. Otherwise, an exception is reported or the interrupt request is ignored.

Operation 305: If the first interrupt request needs to be processed in a user mode of the host, information about a shadow thread is set.

The information about the shadow thread includes memory address space occupied by the shadow thread, information about a thread data structure, an entry address of an interrupt processing function, and the like.

Operation 306: If the first interrupt request needs to be processed in a kernel mode of the host, the interrupt controller notifies the second processor to process the first interrupt request in the kernel mode.

A second interrupt request is a user-mode virtual event interrupt.

Operation 307: The interrupt controller sends the second interrupt request to the second processor. Correspondingly, the second processor receives the second interrupt request sent by the interrupt controller.

The second interrupt request includes information indicating a privilege level of the host.

Operation 308: The second processor determines whether a current state of the second processor supports a corresponding user-mode interrupt, and if the current state of the second processor supports the corresponding user-mode interrupt, operation 309 is performed, or if the current state of the second processor does not support the corresponding user-mode interrupt, operation 310 is performed.

Operation 309: If the second processor currently supports the user-mode interrupt, the second processor switches information about a first thread to information about the shadow thread.

The first thread refers to a thread currently running by the second processor, and the information about the shadow thread is information set by the interrupt controller in operation 305.

Operation 310: If the second processor currently does not support the user-mode interrupt, the second processor triggers an exception or an interrupt to notify the kernel to process the virtual event interrupt.

The second processor identifies, in the kernel mode, a triggering cause of the exception or the interrupt, and then schedules and wakes up a virtual I/O processing thread. The virtual I/O processing thread processes the virtual event interrupt. After processing the virtual event interrupt, the virtual I/O processing thread is blocked and waits for a notification of virtual event processing for a next time.

If the second processor is currently in an idle state, the second processor cannot respond to the user-mode interrupt.

Operation 311: If the second processor supports the user-mode interrupt, the second processor determines whether the first thread is at a virtualization privilege level, and if the first thread is at the virtualization privilege level, operation 312 is performed, or if the first thread is not at the virtualization privilege level, operation 315 is performed.

Operation 312: The second processor switches from the virtualization privilege level to the user mode of the host.

Operation 311 may be performed by the second redirection apparatus in FIG. 6.

Operation 313: The second processor switches to an entry address of an interrupt processing function of the shadow thread to execute an interrupt processing function corresponding to the VEI physical number.

In the computer device, a mapping relationship between a VEI physical number and an interrupt processing function may be maintained by using a memory, and the second processor may read a corresponding interrupt processing function from the memory based on the VEI physical number.

If the first thread is at the virtualization privilege level, a context of the second VM running on the second processor is stored, and a context of the shadow thread is restored.

The second processor may run a thread in the user mode to trap into the kernel mode by using a system call, and then invoke a driver of a physical I/O device, to operate the physical I/O device.

Operation 314: After completing execution of the second interrupt request, the second processor restores a context of the second VM, switches back to the virtualization privilege level before the interruption, and switches to an interrupted instruction address of the second VM to run the second VM to continue to execute the interrupted instruction.

Operation 315: If the first thread is not at the virtualization privilege level, respond to the user-mode interrupt, and switch to an entry address of an interrupt processing function of the shadow thread to execute an interrupt processing function corresponding to the VEI physical number.

If the first thread is not at the virtualization privilege level, the hardware-assisted switching apparatus in FIG. 6 directly responds to the user-mode interrupt, and switches to the entry address of the interrupt processing function of the shadow thread to execute the second interrupt request.

If the first thread is not at the virtualization privilege level, a context of the first thread is stored, and a context of the shadow thread is restored.

Operation 316: If an interrupted thread is not at the virtualization privilege level, restore context of the first thread, and switch to the first thread to continue to execute the interrupted instruction.

In the asynchronous processing manner 1, the VEI ID, the VM ID, and the VEI physical number are used. If the VEI ID is globally unique, the interrupt processing procedure in FIG. 10A and FIG. 10B may be simplified, the corresponding procedure described in the embodiment corresponding to FIG. 10A and FIG. 10B can be implemented only by using the VEI ID to determine the identifier of the corresponding second processor and the privilege level of the corresponding host.

According to the computer system provided in this embodiment of this application, an exception or an interrupt that occurs during running of the first VM is transferred, by using the interrupt controller and the second processor in an asynchronous processing manner, to the user mode of the host for processing. Therefore, overheads of switching between the kernel mode of the host and the user mode of the host are not required, and performance of the computer system is improved.

Asynchronous processing manner 2: A transmit end procedure does not include a kernel of a host, and a receive end procedure passes through the kernel of the host.

In the asynchronous processing manner 2, the procedure at the transmit end is the same as the procedure in the foregoing asynchronous processing manner 1, and is implemented by setting a virtual event interrupt component in the first processor and the interrupt controller.

A difference lies in that the interrupt controller sends a second interrupt request of the kernel to the second processor.

Figure 11:
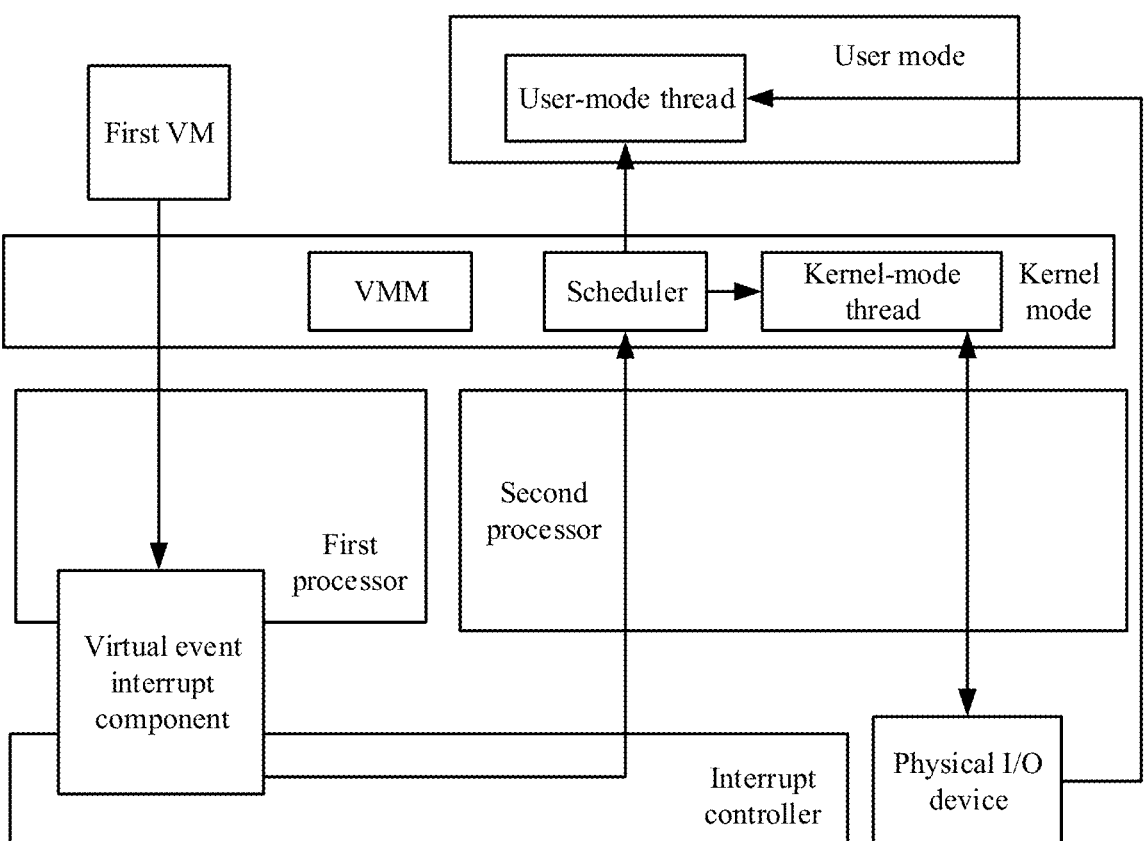
FIG. 11 is another schematic diagram of a structure of a computer device according to an embodiment of this application.

As shown in FIG. 11, after receiving the second interrupt request of the kernel, the second processor switches to an entry address of an interrupt processing function of the kernel.

Before switching to the entry address of the interrupt processing function of the kernel mode of the host, if a second VM runs on the second processor, a virtualization privilege level of the second VM is switched to the kernel mode of the host; if no virtual machine runs on the second processor, the host is in the user mode, and the host is first switched from the user mode of the host to the kernel mode of the host; and if the host is in the kernel mode, the host directly switches to the entry address of the interrupt processing function.

The kernel processes the interrupt request, and wakes up, by using a scheduler, a kernel-mode thread or a user-mode thread in a virtual I/O processing thread to process the second interrupt request.

If the scheduler wakes up the user-mode thread, a processing procedure may be that the second processor runs the user-mode thread to be trapped in the kernel mode through a system call, and then invokes a driver of a physical I/O device, to operate the physical I/O device.

If the scheduler wakes up the kernel-mode thread, a processing procedure may run the kernel-mode thread to invoke a driver of a physical I/O device, to operate the physical I/O device.

Compared with an asynchronous virtual I/O processing framework in the foregoing asynchronous processing manner 1, in this embodiment of this application, hardware-assisted switching logic and a shadow thread technology may be not required, and design and implementation of the asynchronous virtual I/O processing framework are simplified.

Asynchronous processing manner 3: A synchronous manner is used in a transmit end procedure, and a receive end procedure does not include a kernel of a host.

In the asynchronous processing manner 3, a procedure at the transmit end implements an asynchronous virtual I/O request notification framework based on a first redirection apparatus and a shadow execution environment in a synchronous virtual I/O processing framework.

Figure 12:
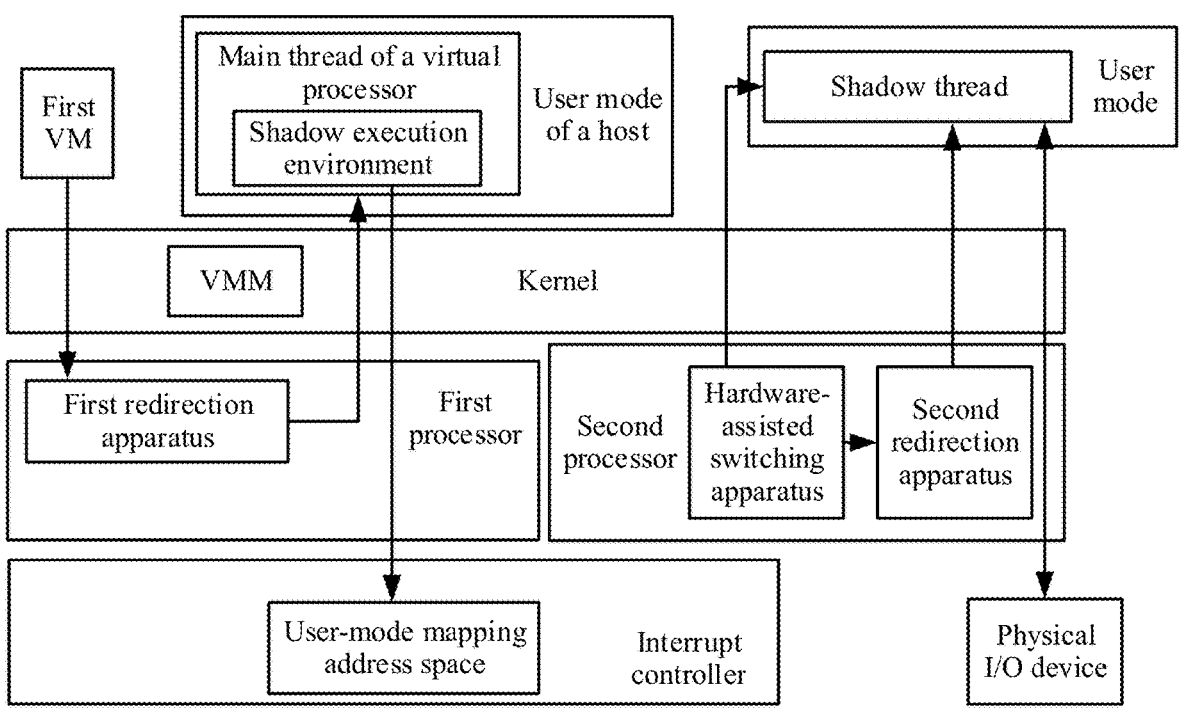
FIG. 12 is another schematic diagram of a structure of a computer device according to an embodiment of this application.

In the asynchronous processing manner 3, as shown in FIG. 12, an interrupt controller includes user-mode mapping address space. A first VM may generate a user-mode exception instruction by using the solution described in the foregoing synchronization manner, enter a user-mode shadow execution environment, and send an interrupt request to a second processor by accessing the user-mode mapping address space in the interrupt controller. The interrupt request may be a user-mode interrupt or a kernel-mode interrupt. Then, the interrupt controller controls the interrupt request to execute a procedure at the receive end in the asynchronous processing manner 1. For this part of content, refer to corresponding content of the receive end in the asynchronous processing manner 1 for understanding, and details are not described herein again.

In this embodiment of this application, overheads of sending an interrupt are reduced to overheads of a context switching procedure, overheads of an irrelevant trapping out procedure of a virtual machine are not required, a virtual event interrupt component in the asynchronous processing manner 1 is not required, and hardware design and implementation complexity is reduced.

Asynchronous processing manner 4: A transmit end procedure passes through a kernel of a host, and a receive end procedure does not include the kernel of the host.

Figure 13:
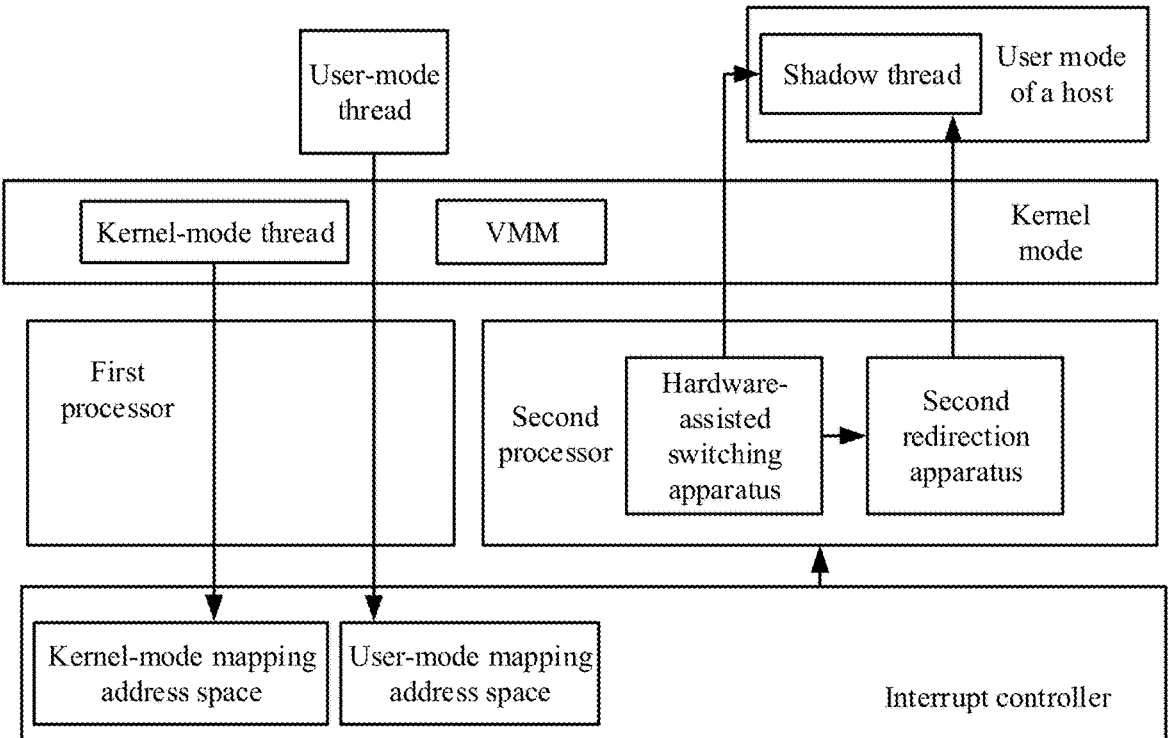
FIG. 13 is another schematic diagram of a structure of a computer device according to an embodiment of this application.

In the asynchronous processing manner 4, as shown in FIG. 13, a virtual machine may not be used in the procedure at the transmit end, and an interrupt controller may include kernel mapping address space and user-mode mapping address space. A first processor may run a kernel-mode thread to access the kernel mapping address space in the interrupt controller to trigger a first interrupt request, and the first processor may run a user-mode thread to access the user-mode mapping address space in the interrupt controller to trigger the first interrupt request. That is, the first processor may send the first interrupt request to the interrupt controller by using the user-mode thread or the kernel-mode thread. The interrupt controller is configured to: set information about a shadow thread, and send a second interrupt request to a second processor. The second processor switches from a first thread to the shadow thread, where the first thread is a thread run by the second processor before switching, the shadow thread is a thread that runs in a host in a user mode and that includes an interrupt processing function, and the interrupt processing function corresponds to the second interrupt request. The second processor is specifically configured to execute the interrupt processing function in the user mode of the host. For a processing procedure of the second processor, refer to the procedure at the receive end in the foregoing asynchronous processing manner 1. Details are not described herein again.

According to the solution provided in this embodiment of this application, in an asynchronous processing manner, an interrupt triggered by the user-mode thread or the kernel-mode thread is transferred, by using an interrupt controller and a second processor, to the user mode of the host for processing. Therefore, overheads of switching between the kernel mode of the host and the user mode of the host are not required, and performance of the computer system is improved.

In another embodiment of this application, a computer-readable storage medium is further provided. The computer-readable storage medium stores computer-executable instructions. When a processor of a device executes the computer-executable instructions, the device performs the exception processing methods in FIG. 2 to FIG. 5.

In another embodiment of this application, a computer-readable storage medium is further provided. The computer-readable storage medium stores computer-executable instructions. When a processor of a device executes the computer-executable instructions, the device performs the interrupt processing methods in FIG. 6 to FIG. 13.

In another embodiment of this application, a computer program product is further provided. The computer program product includes computer-executable instructions, and the computer-executable instructions are stored in a computer-readable storage medium. When a processor of a device executes the computer-executable instructions, the device performs the exception processing methods in FIG. 2 to FIG. 5.

In another embodiment of this application, a computer program product is further provided. The computer program product includes computer-executable instructions, and the computer-executable instructions are stored in a computer-readable storage medium. When a processor of a device executes the computer-executable instructions, the device performs the interrupt processing methods in FIG. 6 to FIG. 13.

In another embodiment of this application, a chip system is further provided. The chip system includes a processor, and the processor is configured to implement the exception processing methods in FIG. 2 to FIG. 5. In a possible design, the chip system may further include a memory. The memory is configured to store program instructions and data that are necessary for exception processing. The chip system may include a chip, or may include a chip and another discrete component.

In another embodiment of this application, a chip system is further provided. The chip system includes a processor, and the processor is configured to perform the interrupt processing methods in FIG. 6 to FIG. 13. In a possible design, the chip system may further include a memory. The memory is configured to store program instructions and data that are for interrupt processing. The chip system may include a chip, or may include a chip and another discrete component.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in embodiments of this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units. In other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A computer device, wherein the computer device comprises a hardware layer and a host runs at the hardware layer, wherein the hardware layer comprises a first processor, and a virtual machine (VM) runs on the first processor, and wherein the first processor comprises a redirection apparatus;

the first processor is configured to obtain an exception instruction triggered by the VM;

the redirection apparatus is configured to:

switch from a virtualization privilege level of the VM to a user mode of the host, wherein the virtualization privilege level of the VM comprises a user mode of the VM and a kernel mode of the VM, wherein the host is a virtualization platform and a privilege level of the host comprises the user mode of the host and a kernel mode of the host; and the first processor is further configured to execute, in the user mode of the host, an exception processing function corresponding to the exception instruction, wherein the exception processing function is comprised in a thread of a virtual processor that runs in the user mode of the host, an execution environment allocated to the thread of the virtual processor comprises a main thread execution environment, an execution environment of the VM, and a shadow execution environment, wherein the shadow execution environment has user-mode memory space independent of the main thread execution environment and the execution environment of the VM, the shadow execution environment is used to execute the exception processing function, and the exception processing function is used to process an exception that triggers the exception instruction.

2. The computer device according to claim 1, wherein the redirection apparatus is further configured to write an entry address of the exception processing function into a first register; and the first processor is configured to: read the entry address of the exception processing function from the first register, invoke the exception processing function based on the entry address, and execute, in the user mode of the host, the exception processing function corresponding to the exception instruction.

3. The computer device according to claim 1, wherein the exception instruction is triggered by an input/output (I/O) operation performed by the VM.

4. The computer device according to claim 1, wherein the first processor is configured to: switch from a context of the VM to a context of a user-mode shadow execution environment, and the user-mode memory space of the shadow execution environment is used to store the context of the VM that is migrated out during context switching.

5. A computer device, wherein the computer device comprises a hardware layer, a host runs at the hardware layer, wherein the host is a virtualization platform, the hardware layer comprises a first processor, a second processor, and an interrupt controller, and a first virtual machine (VM) runs on the first processor, and wherein the first processor comprises a virtual event notification apparatus;

the first processor is configured to obtain a first interrupt request triggered by the first VM, wherein the first interrupt request is used to request to execute an interrupt processing function;

the virtual event notification apparatus is configured to send interrupt information to the interrupt controller in response to the first interrupt request;

the interrupt controller is configured to: determine an identifier of the second processor based on the interrupt information, and send a second interrupt request to the second processor based on the identifier of the second processor, wherein the second interrupt request is used to request the second processor to execute the interrupt processing function; and the second processor is configured to execute the interrupt processing function in response to the received second interrupt request, the second processor further comprises a hardware-assisted switching apparatus;

the hardware-assisted switching apparatus is configured to:

switch from a first thread to a shadow thread, wherein the first thread is a thread run by the second processor before switching, the shadow thread is a thread that runs in the host in a user mode, and the shadow thread is used to execute the interrupt processing function, wherein the host is a virtualization platform and a privilege level of the host comprises the user mode and a kernel mode; and the second processor is configured to execute the interrupt processing function in the user mode of the host.

6. The computer device according to claim 5, wherein the first interrupt request comprises a virtual event interrupt request number (VEI ID), and the VEI ID identifies a virtual event that triggers the first interrupt request;

the first processor is further configured to obtain a VM ID of the first VM;

the interrupt information comprises the VEI ID and the VM ID of the first VM;

the interrupt controller is configured to: determine, based on the VEI ID and the VM ID of the first VM, an identifier of the second processor, a VEI physical number, and a privilege level of the host that processes the first interrupt request, wherein the VEI physical number identifies the virtual event in the host; and send a second interrupt request to the second processor based on the identifier of the second processor, wherein the second interrupt request comprises information indicating the privilege level of the host; and the second processor is configured to: obtain the VEI physical number, and execute, based on a processing manner corresponding to the privilege level of the host, an interrupt processing function corresponding to the VEI physical number in response to the received second interrupt request.

7. The computer device according to claim 6, wherein the privilege level of the host is a user mode.

8. The computer device according to claim 7, wherein the second processor further comprises a redirection apparatus;

the second processor is further configured to: before executing the interrupt processing function in the user mode of the host, determine whether the first thread is at a virtualization privilege level of a second VM, wherein the second VM runs on the second processor; and the redirection apparatus is configured to: if an interrupted thread is at the virtualization privilege level of the second VM, switch the virtualization privilege level of the second VM to the user mode of the host.

9. The computer device according to claim 8, wherein the redirection apparatus is further configured to write an entry address of the interrupt processing function into a first register; and the second processor is configured to: read the entry address of the interrupt processing function from the first register, invoke the interrupt processing function based on the entry address, and execute the interrupt processing function in the user mode of the host.

10. The computer device according to claim 6, wherein the privilege level of the host is a kernel mode, and the second processor is configured to:

receive the second interrupt request that is of the kernel mode of the host and that is sent by the interrupt controller; and switch to an entry address of an interrupt processing function of the kernel mode of the host, wherein the interrupt processing function corresponds to the second interrupt request; and execute, in the kernel mode of the host, the interrupt processing function of the kernel mode.

11. The computer device according to claim 5, wherein the first interrupt request comprises a virtual event interrupt request number (VEI ID), and the VEI ID identifies a virtual event that triggers the first interrupt request;

the interrupt information comprises the VEI ID;

the interrupt controller is configured to: determine, based on the VEI ID, an identifier of the second processor and a privilege level of the host that processes the first interrupt request; and send a second interrupt request to the second processor based on the identifier of the second processor, wherein the second interrupt request comprises information indicating the privilege level of the host; and the second processor is configured to: obtain the VEI ID, and execute, based on a processing manner corresponding to the privilege level of the host, an interrupt processing function corresponding to the VEI ID in response to the received second interrupt request.

12. An exception processing method, wherein the method is applied to a computer device, a host and a virtual machine (VM) run on the computer device, and the method comprises:

obtaining an exception instruction triggered by the VM; and switching from a virtualization privilege level of the VM to a user mode of the host, wherein the virtualization privilege level of the VM comprises a user mode of the VM and a kernel mode of the VM, wherein the host is a virtualization platform and a privilege level of the host comprises the user mode of the host and a kernel mode of the host; and executing, in the user mode of the host, an exception processing function corresponding to the exception instruction, wherein the exception processing function is comprised in a thread of a virtual processor that runs in the user mode of the host, an execution environment allocated to the thread of the virtual processor comprises a main thread execution environment, an execution environment of the VM, and a shadow execution environment, wherein the shadow execution environment has user-mode memory space independent of the main thread execution environment and the execution environment of the VM, the shadow execution environment is used to execute the exception processing function, and the exception processing function is used to process an exception that triggers the exception instruction.

13. The method according to claim 12, wherein the method further comprises:

writing an entry address of the exception processing function into a first register; and the executing, in the user mode of the host, an exception processing function corresponding to the exception instruction comprises:

reading the entry address of the exception processing function from the first register, invoking the exception processing function based on the entry address, and executing, in the user mode of the host, the exception processing function corresponding to the exception instruction.

14. The method according to claim 12, wherein the exception instruction is triggered by an input/output (I/O) operation performed by the VM.

15. The method according to claim 12, wherein the executing, in the user mode of the host, an exception processing function corresponding to the exception instruction comprises:

switching from a context of the VM to a context of a shadow execution environment of the user mode, and processing an exception in the user mode of the host.

16. An interrupt processing method, wherein the method is applied to a computer device, a host and a first virtual machine (VM) run on the computer device, and the method comprises:

obtaining a first interrupt request triggered by the first VM, wherein the first interrupt request is used to request to execute an interrupt processing function;

determining interrupt information in response to the first interrupt request;

generating a second interrupt request based on the interrupt information, wherein the second interrupt request is used to request to execute the interrupt processing function; and executing the interrupt processing function in response to the second interrupt request, comprising:

switching from a first thread to a shadow thread, wherein the first thread is a thread run by the host before switching, the shadow thread is a thread that runs in the host in a user mode, and the shadow thread is used to execute the interrupt processing function, wherein the host is a virtualization platform and a privilege level of the host comprises the user mode and a kernel mode; and executing the interrupt processing function in the user mode of the host.

17. The method according to claim 16, wherein the first interrupt request comprises a virtual event interrupt request number (VEI ID), and the VEI ID identifies a virtual event that triggers the first interrupt request; and the method further comprises:

obtaining a VM identifier (ID) of the first VM, wherein the interrupt information comprises the VEI ID and the VM ID of the first VM;

determining, based on the VEI ID and the VM ID of the first VM, a corresponding VEI physical number and a privilege level of the host that processes the first interrupt request, wherein the VEI physical number identifies the virtual event in the host; and the executing the interrupt processing function in response to the second interrupt request comprises:

obtaining the VEI physical number, and executing, based on a processing manner corresponding to the privilege level of the host, an interrupt processing function corresponding to the VEI physical number in response to the received second interrupt request.

18. The method according to claim 17, wherein the privilege level of the host is a user mode.

19. The method according to claim 17, wherein the privilege level of the host is a kernel mode, and the executing, based on a processing manner corresponding to the privilege level of the host, the interrupt processing function corresponding to the VEI ID in response to the received second interrupt request comprises:

switching to an entry address of an interrupt processing function of the kernel mode of the host, wherein the interrupt processing function corresponds to the second interrupt request; and executing, in the kernel mode of the host, the interrupt processing function of the kernel mode.

20. The method according to claim 16, wherein the first interrupt request comprises a virtual event interrupt request number (VEI ID), the VEI ID identifies a virtual event that triggers the first interrupt request, and the interrupt information comprises the VEI ID; and the method further comprises:

determining, based on the VEI ID, a privilege level of the host that processes the first interrupt request; and the executing the interrupt processing function in response to the second interrupt request comprises:

obtaining the VEI ID, and executing, based on a processing manner corresponding to the privilege level of the host, an interrupt processing function corresponding to the VEI ID in response to the received second interrupt request.

* * * * *